United States Patent
Ozasa et al.

(10) Patent No.: US 9,363,591 B2
(45) Date of Patent: Jun. 7, 2016

(54) ELECTRONIC DEVICE

(71) Applicant: KYOCERA CORPORATION, Kyoto (JP)

(72) Inventors: Kenichi Ozasa, Yokohama (JP); Hayato Mizuno, Higashiosaka (JP); Hiroto Yahagi, Yokohama (JP); Keiichi Nagoshi, Higashiosaka (JP); Tsutomu Zaima, Machida (JP); Koutatsu Kanayama, Higashiosaka (JP); Tomoaki Nakamura, Machida (JP); Hideo Tomioka, Yokohama (JP); Takuji Masunaga, Shirakawa (JP); Tomohiro Inagaki, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/361,949

(22) PCT Filed: May 20, 2013

(86) PCT No.: PCT/JP2013/003207
§ 371 (c)(1),
(2) Date: May 30, 2014

(87) PCT Pub. No.: WO2013/175761
PCT Pub. Date: Nov. 28, 2013

(65) Prior Publication Data
US 2015/0036864 A1    Feb. 5, 2015

(30) Foreign Application Priority Data

May 21, 2012  (JP) ................. 2012-115795
May 21, 2012  (JP) ................. 2012-116060
May 22, 2012  (JP) ................. 2012-117003

(51) Int. Cl.
H04R 1/02      (2006.01)
H04R 7/04      (2006.01)
(Continued)

(52) U.S. Cl.
CPC ............... *H04R 1/028* (2013.01); *H04R 7/045* (2013.01); *H04M 1/03* (2013.01); *H04R 17/00* (2013.01);
(Continued)

(58) Field of Classification Search
CPC .............. H04R 2217/00–2217/03; H04R 1/02; H04R 1/025; H04R 1/026; H04R 2440/00–2440/07
USPC .................. 381/333, 190, 388, 152
See application file for complete search history.

(56) References Cited

U.S. PATENT DOCUMENTS 6,427,017 B1 * 7/2002 Toki ............................. 381/190
7,050,600 B2 * 5/2006 Saiki et al. ................... 381/388

FOREIGN PATENT DOCUMENTS

JP    2004-187031 A    7/2004
JP    2004-336403 A    11/2004
(Continued)

OTHER PUBLICATIONS

An Office Action; "Notice of Reasons for Rejection," issued by the Japanese Patent Office on Sep. 24, 2014, which corresponds to Japanese Patent Application No. 2014-022638 and is related to U.S. Appl. No. 14/361,949; with English language concise explanation.
(Continued)

Primary Examiner — Suhan Ni
(74) Attorney, Agent, or Firm — Studebaker & Brackett PC

(57) ABSTRACT

An electronic device is provided with a housing, a piezoelectric element, and a panel, which is attached to the housing and has a contact area contacting a part of human body, configured to vibrate by the piezoelectric element to generate a vibration sound to be transmitted by vibrating the part of human body, such that pressure from inside of the housing at the contact area of the panel is smaller than pressure from inside of the housing at different area from the contact area. Thereby the sound pressure property is improved, and thus the electronic device preferably transmits air conduction sound and vibration sound.

4 Claims, 36 Drawing Sheets

(51) Int. Cl.
*H04M 1/03* (2006.01)
*H04R 17/00* (2006.01)

(52) U.S. Cl.
CPC ......... *H04R 2400/03* (2013.01); *H04R 2440/05* (2013.01); *H04R 2440/07* (2013.01); *H04R 2499/11* (2013.01)

(56) References Cited

FOREIGN PATENT DOCUMENTS

| | | |
|---|---|---|
| JP | 2005-348193 A | 12/2005 |
| JP | 2006-333021 A | 12/2006 |
| JP | 2007-082009 A | 3/2007 |
| JP | 2011-091719 A | 5/2011 |
| JP | 2013-243564 A | 12/2013 |
| WO | 2014/003148 A1 | 1/2014 |

OTHER PUBLICATIONS

International Search Report; PCT/JP2013/003207; Aug. 20, 2013.
An Office Action; "Notice of Reasons for Rejection," issued by the Japanese Patent Office on Apr. 21, 2015, which corresponds to Japanese Patent Application No. 2014-022638 and is related to U.S. Appl. No. 14/361,949; with English language concise explanation.

* cited by examiner

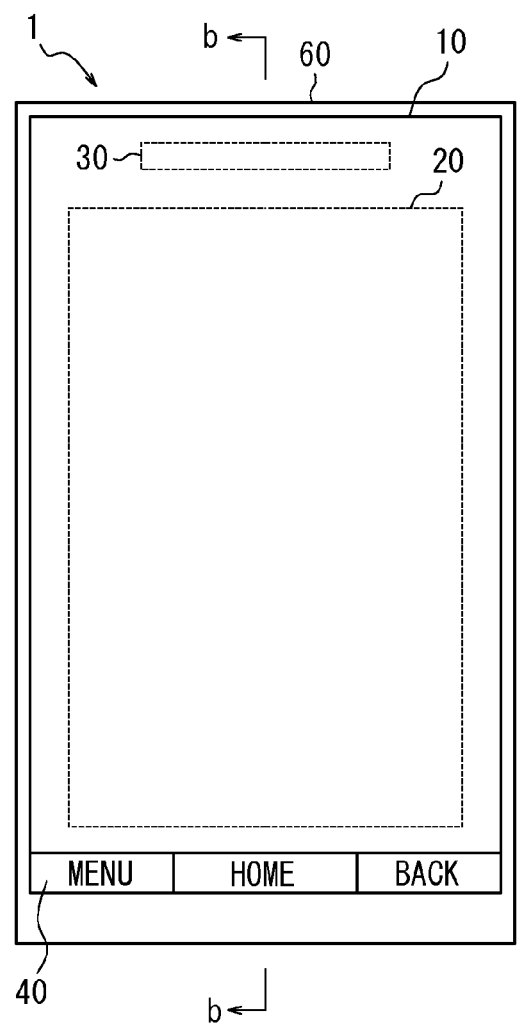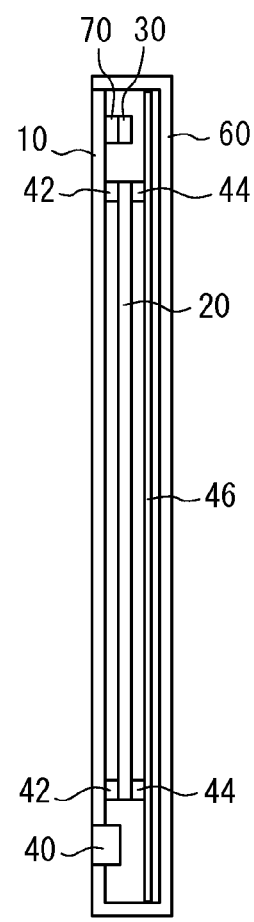

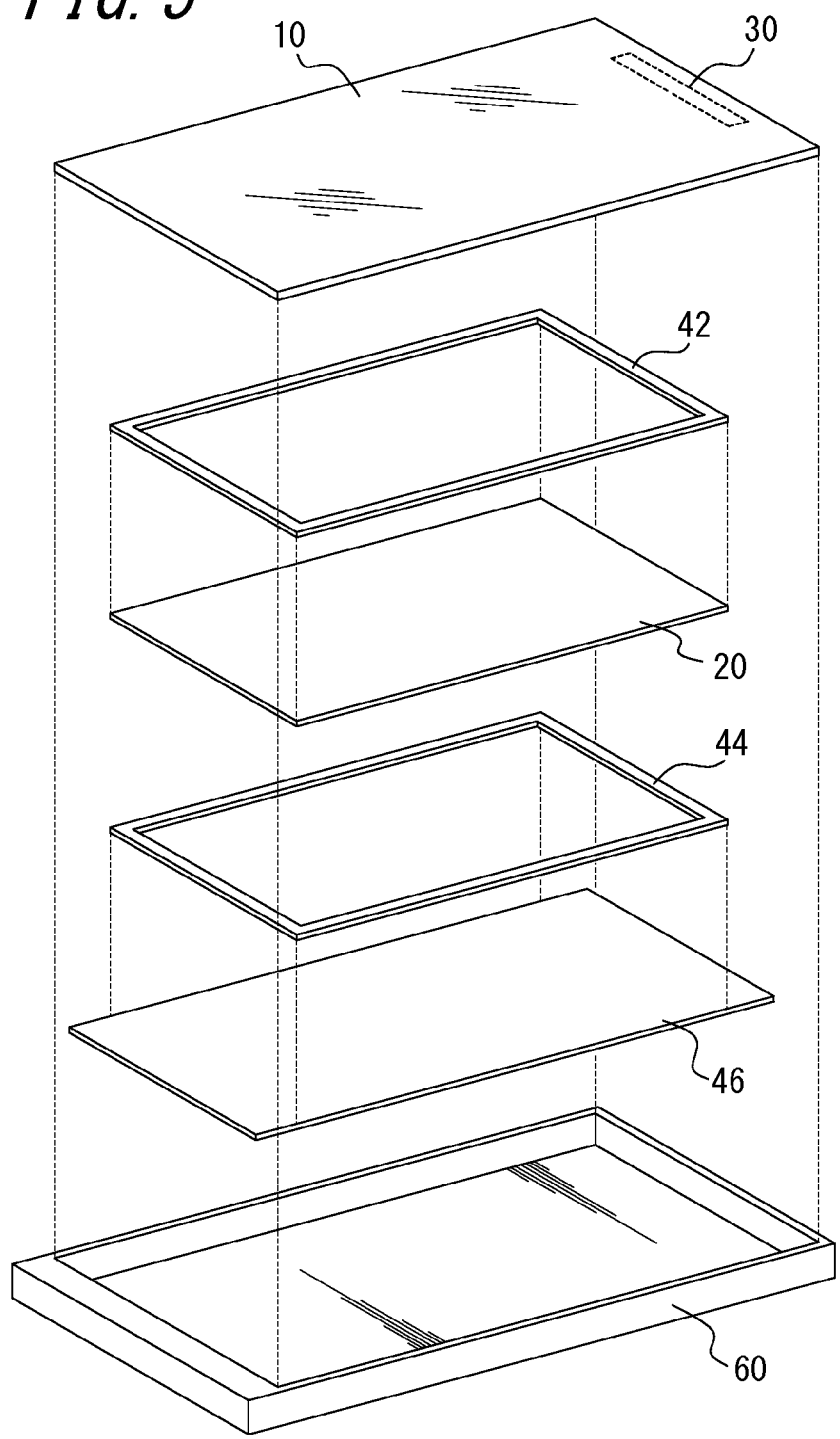

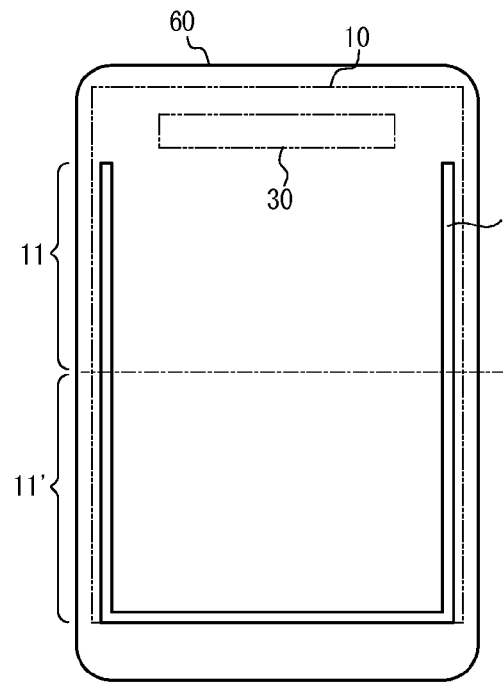 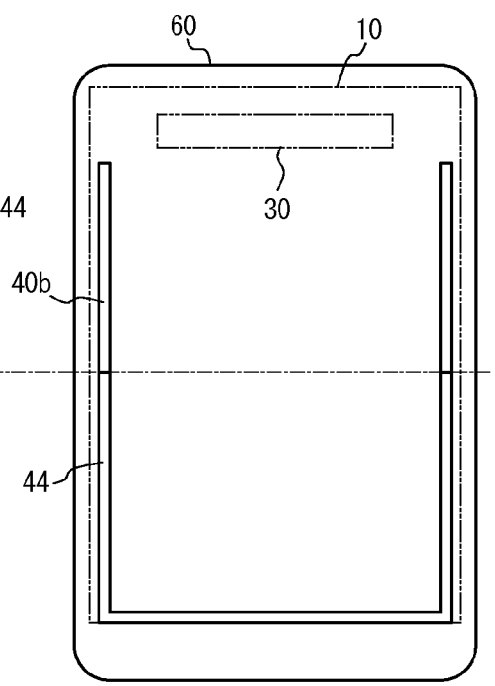

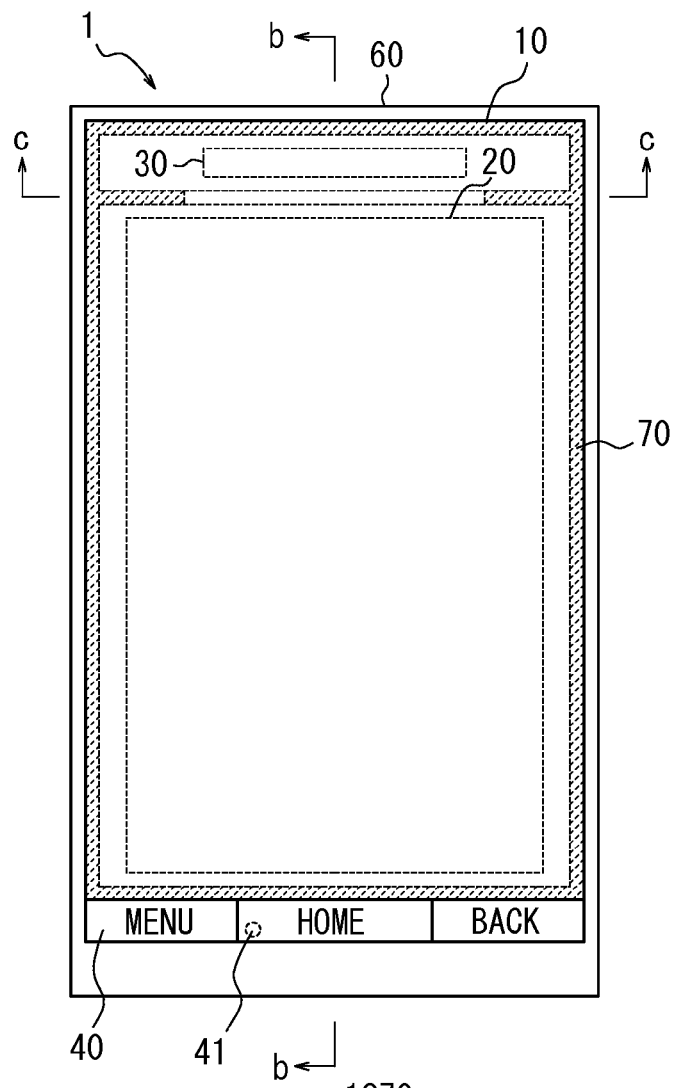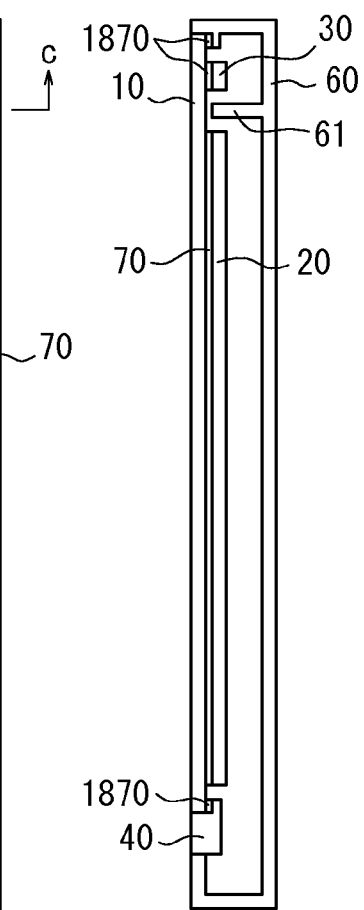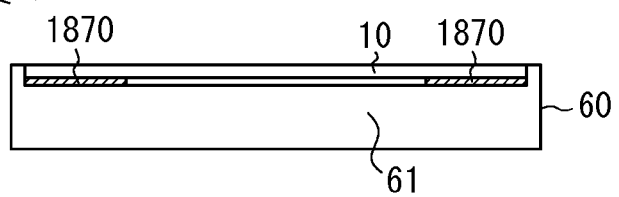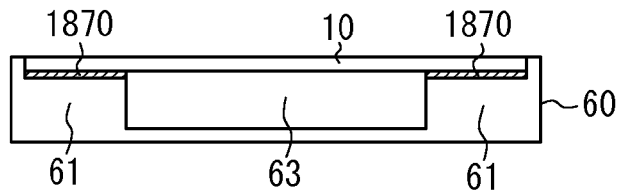

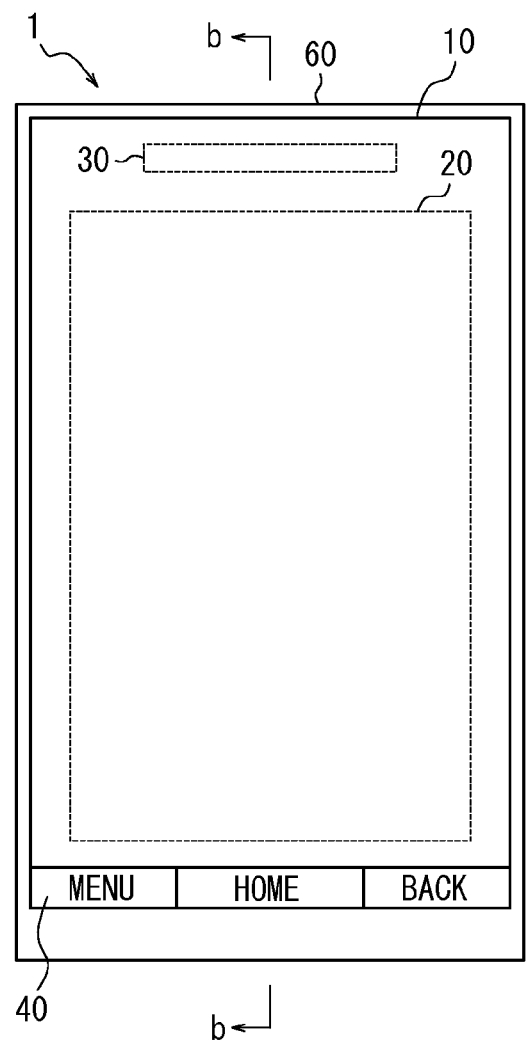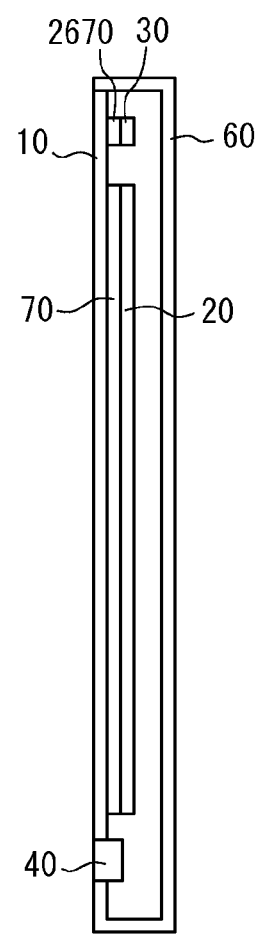

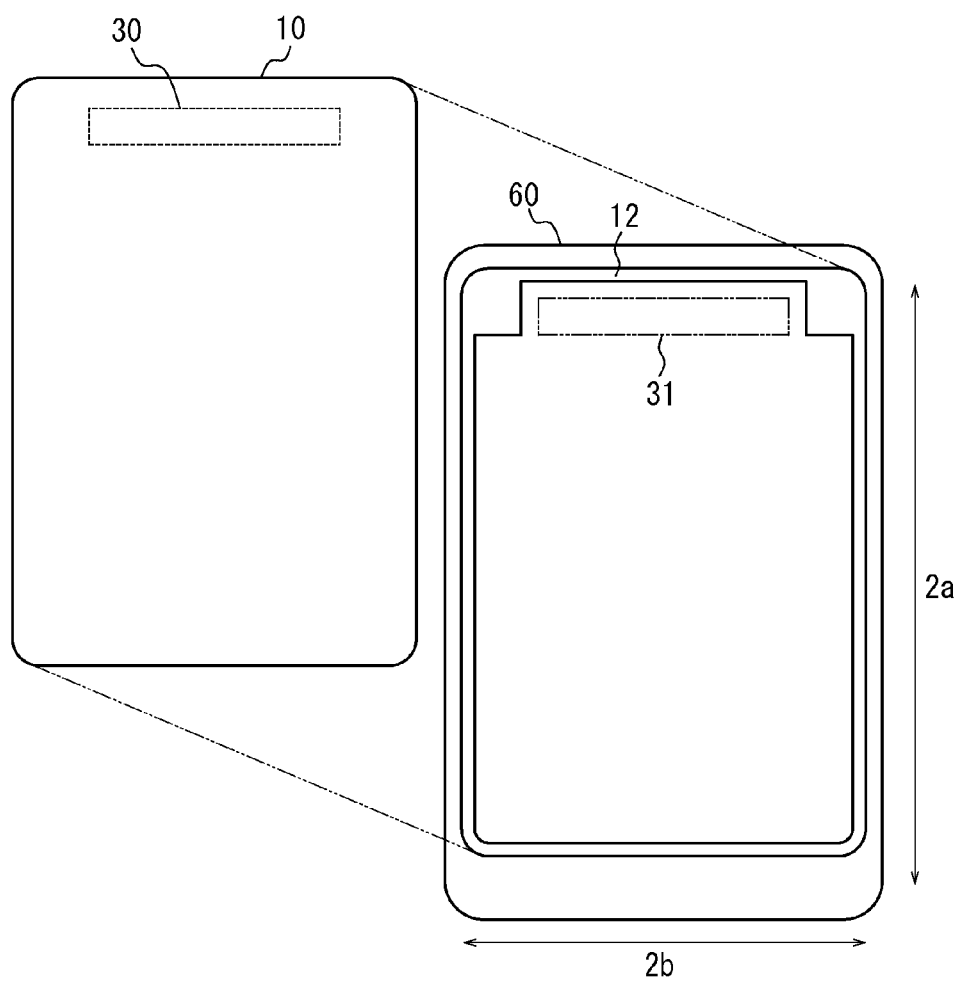

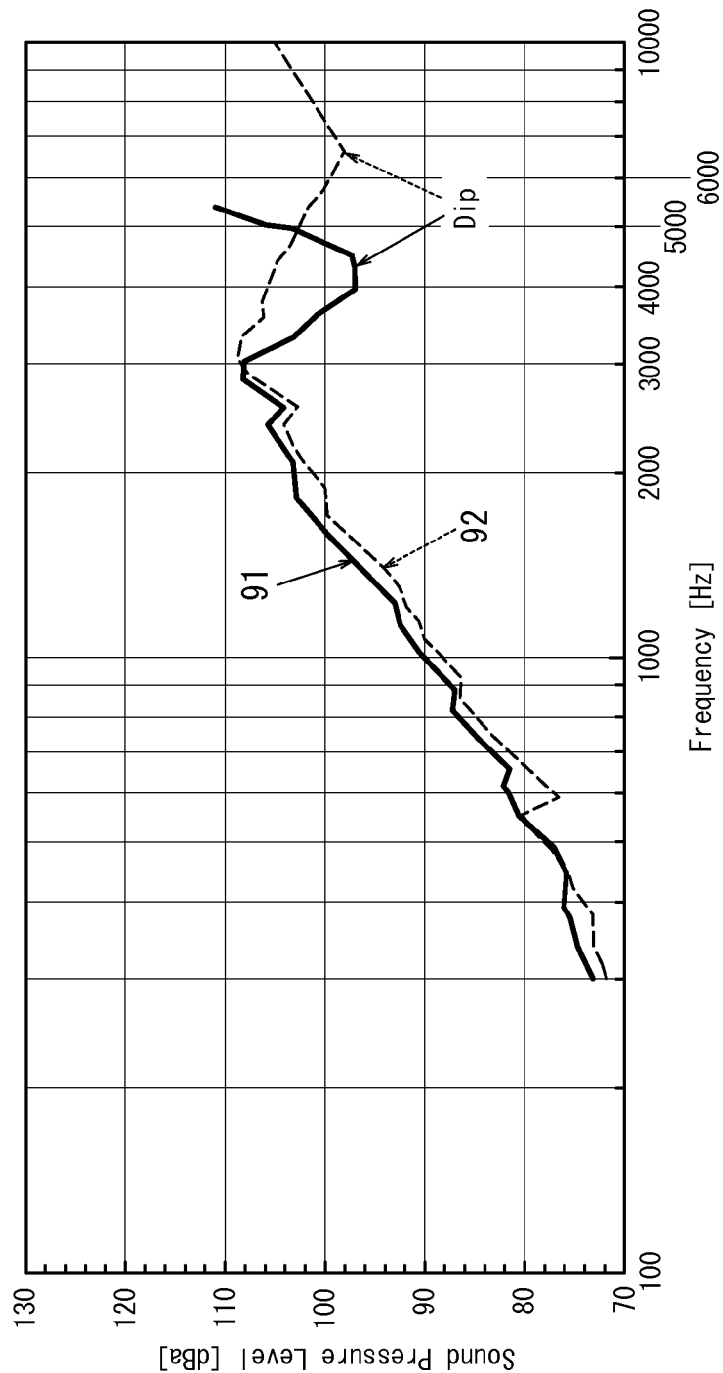

ELECTRONIC DEVICE

CROSS-REFERENCE TO RELATED APPLICATION

This application claims priority to and the benefit of Japanese Patent Applications No. 2012-116060 filed on May 21, 2012, No. 2012-117003 filed on May 22, 2012, and No. 2012-115795 filed on May 21, 2012, the entire contents of which are incorporated herein by reference.

FIELD

The present invention relates to an electronic device that vibrates a panel by applying a predetermined electric signal (audio signal) to a piezoelectric element and that transmits air-conducted sound and vibration sound to a user by transmitting the vibration of the panel to the user's body.

BACKGROUND ART

Patent Literature 1 recites an electronic device, such as a mobile phone or the like, that transmits air-conducted sound and bone-conducted sound to a user. As the air-conducted sound, Patent Literature 1 recites a sound that is transmitted to the user's auditory nerve by air vibrations, caused by a vibrating object, that are transmitted through the external ear canal to the eardrum and cause the eardrum to vibrate. As the bone-conducted sound, Patent Literature 1 recites a sound that is transmitted to the user's auditory nerve through a portion of the user's body (such as the cartilage of the outer ear) that is touching a vibrating object.

Patent Literature 1 recites a telephone in which a rectangular vibrating body, formed from a piezoelectric bimorph and a flexible substance, is attached to an outer surface of a housing via an elastic member. Patent Literature 1 also discloses that when voltage is applied to the piezoelectric bimorph in the vibrating body, the piezoelectric material expands and contracts in the longitudinal direction, causing the vibrating body to undergo bending vibration. Air-conducted sound and vibration sound are transmitted to the user when the user touches the vibrating body to the auricle.

CITATION LIST

Patent Literature 1: JP2005348193A

SUMMARY OF INVENTION

In the electronic device described in Patent Literature 1, the vibration body is attached to the outer surface of the housing of the mobile phone or the like. A problem posed when the panel attached to the housing is vibrated is not taken into consideration.

In the electronic device recited in Patent Literature 1, the vibrating body is mounted on outside of a housing of a cellular phone and the like, and therefore no consideration is made of an electronic device provided with a panel as a vibrating plate.

The present invention is to provide an electronic device of a kind generating an air-conduction sound and a vibration sound, which may preferably operate.

An electronic device according to one aspect of the present invention includes:
a housing;
a piezoelectric element; and
a panel, which is attached to the housing and has a contact area contacting a part of human body, configured to vibrate by the piezoelectric element to generate a vibration sound to be transmitted by vibrating the part of human body, such that
pressure from inside of the housing at the contact area of the panel is smaller than pressure from inside of the housing at different area from the contact area.

An electronic device according to another aspect of the present invention includes:
a housing;
a piezoelectric element;
a panel, which is attached to the housing and has a contact area contacting a part of human body, configured to vibrate by the piezoelectric element to generate a vibration sound to be transmitted by vibrating the part of human body;
a first elastic member configured to contact the contact area of the panel from inside of the housing; and
a second elastic member configured to contact, from inside of the housing, different area from the contact area, such that
the first the elastic member is more deformable than the second the elastic member.

An electronic device according to yet another aspect of the present invention includes:
a housing;
a piezoelectric element;
a panel, which is attached to the housing and has a contact area contacting a part of human body, configured to vibrate by the piezoelectric element to generate a vibration sound to be transmitted by vibrating the part of human body;
an elastic member configured to contact, from inside of the housing, different area from the contact area, wherein
the elastic member is disposed out of the contact area.

The electronic device according to the above aspects further includes a interior member disposed inside of the housing, such that the first the elastic member is disposed between the panel and the interior member. Further, the first the elastic member may be disposed along a periphery of the interior member.

The electronic device according to the above aspects is such that the first the elastic member inhibits water or dust from entering space between the panel and the interior member.

An electronic device according to yet another aspect of the present invention includes: a housing;
a piezoelectric element;
a panel, which is attached to the housing and has a contact area contacting a part of human body, configured to vibrate by the piezoelectric element to generate a vibration sound to be transmitted by vibrating the part of human body; and
an elastic member disposed between the panel and the interior member, such that
the panel has an attach area where the piezoelectric element is attached, and the panel and the interior member are disposed tilting against each other such that a portion nearer to the attach area of the elastic member is contracted more than a portion farther from the attach area of the elastic member.

The panel may vibrate in an area larger than an area having a length corresponding to a distance from an inferior crus antihelix to an antitragus and a width corresponding to a distance from a tragus to an antihelix.

The panel may constitute a portion or an entirety of any one of a display panel, an input panel, a cover panel and a lid that allows for removal of a rechargeable battery. Further, the panel may constitute a display panel, such that the piezoelectric element is disposed outside of a display region for a display function.

The panel may deform in every area thereof to transmit a vibration sound.

The panel may have in vibrating area thereof plurality of portions which vibrates in directions crossing surface or the panel, and an amplitude of vibration in each of the plurality of the portions may transition over time from plus to minus or vice versa.

The panel may further generate air-conduction sound.

An electronic device according to yet another aspect of the present invention includes:
 a housing;
 a piezoelectric element;
 a panel, which is attached to the housing and has a contact area contacting a part of human body, configured to vibrate by the piezoelectric element to generate a vibration sound to be transmitted by vibrating the part of human body; and
 a first joining member configured to adhere the panel to the housing, wherein
 the panel has a contact area to be contacted by the part of human body, and
 the first joining member is disposed in other area than the contact area.
In other words, the first joining member is disposed in a different area from the contact area.

The piezoelectric element may be disposed inside of a periphery of the panel in planar view, and the first joining member may be disposed on the periphery of the panel.

The first joining member may include a non-thermosetting adhesive agent.

The first joining member may include a double-sided adhesive tape.

The piezoelectric element may be joined to the panel by the second joining member.

The second joining member may include a non-thermosetting adhesive agent.

The second joining member may include a double-sided adhesive tape.

The panel may vibrate in an area larger than an area having a length corresponding to a distance from an inferior crus antihelix to an antitragus and a width corresponding to a distance from a tragus to an antihelix.

The panel may constitute a portion or an entirety of any one of a display panel, an input panel, a cover panel and a lid that allows for removal of a rechargeable battery.

The panel may constitutes a display panel, such that the piezoelectric element is disposed outside of a display region for a display function.

The panel may deform in every area thereof to transmit a vibration sound.

The panel may have in vibrating area thereof plurality of portions which vibrates in directions crossing surface or the panel, and an amplitude of vibration in each of the plurality of the portions may transition over time from plus to minus or vice versa.

An electronic device according to yet another aspect of the present invention includes:
 a housing;
 a piezoelectric element; and
 a panel, which is attached to the housing and has a contact area contacting a part of human body, configured to vibrate by the piezoelectric element to generate a vibration sound to be transmitted by vibrating the part of human body, such that
 the panel has an attach area where the piezoelectric element is attached and a contact area to be contacted by the part of human body, and
 the first joining member is disposed in other area than between the attach area and the contact area.
In other words, the first joining member is disposed in a different area from between the attach area and the contact area.

An electronic device according to yet another aspect of the present invention includes:
 a housing;
 a piezoelectric element;
 a panel, which is attached to the housing and has a contact area contacting a part of human body, configured to vibrate by the piezoelectric element to generate a vibration sound to be transmitted by vibrating the part of human body; and
 a first joining member configured to adhere the panel to the housing, such that
 the panel has an attach area where the piezoelectric element is attached and a contact area to be contacted by the part of human body, and
 the first joining member is disposed in other area than the attach area, the contact area, or an area surrounded by the attach area or the contact area.
In other words, the first joining member is disposed in a different area from the attach area, the contact area, or an area surrounded by the attach area or the contact area.

The panel may further generate air-conduction sound.

An electronic device according to yet another aspect of the present invention includes:
 a housing;
 a piezoelectric element;
 a panel, which is attached to the housing and has a contact area contacting a part of human body, configured to vibrate by the piezoelectric element to generate a vibration sound to be transmitted by vibrating the part of human body;
 a first joining member configured to adhere the panel to the housing near an attach position where piezoelectric element is attached; and
 a second joining member configured to adhere the panel to the housing at a different position from the attach position by the first joining member.

The first joining member may be disposed on a longitudinal side of the piezoelectric element or on a side along an expand/contract direction of the piezoelectric element, with respect thereto.

The second joining member is disposed on a short side of the piezoelectric element, or on a side along a direction crossing an expand/contract direction of the piezoelectric element, with respect thereto.

The second joining member may be disposed at an end of the panel. Preferably, the second joining member may be disposed at an end along the periphery of the panel.

One or both of the first and the second joining member s may inhibit water or dust from entering space between the panel.

The first joining member may include material which is less deformable than the material used in the second joining member.

The first and the second joining member s may be joined with each other.

The first joining member may be disposed between a position where the piezoelectric element is attached and the second joining member.

An electronic device according to yet another aspect of the present invention includes:
 a housing;
 a piezoelectric element;
 a panel, which is attached to the housing and has a contact area contacting a part of human body, configured to vibrate by the piezoelectric element to generate a vibration sound to be transmitted by vibrating the part of human body, such that the panel is attached to the housing by a first joining member near a position where the piezoelectric element is attached and by a second joining member having less adhesivity than the first joining member at other position.

The first joining member may be used on a longitudinal side of the piezoelectric element with respect thereto, and the second joining member may be used on a short side of the piezoelectric element with respect thereto.

The first joining member is used on a side along an expand/contract direction of the piezoelectric element with respect thereto, and the second joining member is used on a side along a direction crossing an expand/contract direction of the piezoelectric element with respect thereto.

The panel may vibrate in an area larger than an area having a length corresponding to a distance from an inferior crus antihelix to an antitragus and a width corresponding to a distance from a tragus to an antihelix. Further, the panel may deform in every area thereof to transmit a vibration sound.

The panel may constitute a portion or an entirety of any one of a display panel, an input panel, a cover panel and a lid that allows for removal of a rechargeable battery. The panel may constitute a display panel, such that the piezoelectric element is disposed outside of a display region for a display function.

the panel may have in vibrating area thereof plurality of portions which vibrates in directions crossing surface or the panel, and an amplitude of vibration in each of the plurality of the portions transitions over time from plus to minus Further, the panel may further generate air-conduction sound.

The present invention provides an electronic device which vibrates a panel to generate a vibration sound, such that pressure applied to the panel from a housing is taken into consideration.

Further, the present invention provides an electronic device which preferably operates by vibrating a panel attached to a housing to generate vibration sound. Further, the present invention provides an electronic device which vibrates a panel attached to a housing to generate vibration sound, such that joining method of the housing and the panel is taken into consideration.

BRIEF DESCRIPTION OF DRAWINGS

The present invention will be further described below with reference to the accompanying drawings, wherein:

FIGS. 4A and 4B illustrate a housing structure of the electronic device according to a first embodiment;

FIG. 5 illustrates a supporting structure of the panel;

FIGS. 11A and 11B illustrate another example of the support;

FIGS. 18A-18D illustrate a housing structure of the electronic device according to a third embodiment;

FIGS. 26A and 26B illustrate a housing structure of the electronic device according to one embodiment;

FIG. 30 illustrates a comparative example of joining of the panel and the housing;

FIG. 32 illustrates a frequency characteristic of a panel according to one embodiment;

DESCRIPTION OF EMBODIMENTS

Figure 1:
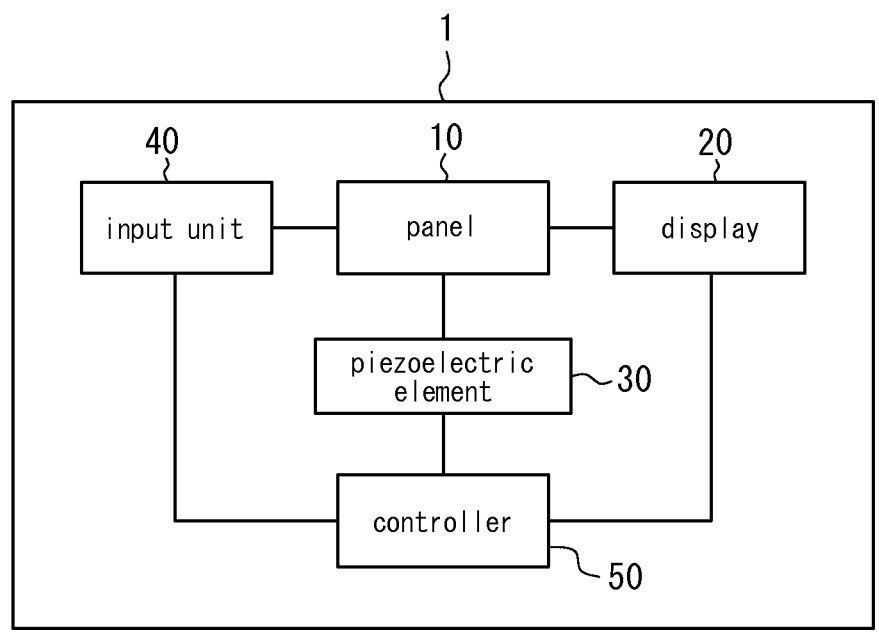
FIG. 1 is a function block diagram of an electronic device according to one embodiment of the present invention.

Embodiments of the present invention will be described with reference to the accompanying drawings. FIG. 1 is a function block diagram of an electronic device 1 according to one embodiment of the present invention. The electronic device 1, which is a mobile phone (smartphone), for example, includes a vibration plate 100, a display 20, a piezoelectric element 30, an input unit 40, and a controller 50. If the electronic device 1 of the embodiments functions as the mobile phone, the acoustic device 100 generates sound which is transmitted to an inner part of a human body by a vibration of the panel 10 generated by the piezoelectric element 30. The sound to be transmitted to an inner part of the human body passes through a soft tissue of the human body (e.g. a cartilage) to vibrate a middle ear or an inner ear.

The panel 10 is a touch panel that detects a touch or is a cover panel or the like that protects the display 20. The panel 10 is, for example, made from glass or a synthetic resin such as acrylic or the like. The panel 10 may be plate-like in shape, or a curved panel having smoothly curved surface. When the panel 10 is a touch panel, the panel 10 detects a touch by the user's finger, a pen, a stylus pen or the like. Any detection system may be used in the touch panel, such as a capacitive system, a resistive film system, a surface acoustic wave system (or an ultrasonic wave system), an infrared system, an electromagnetic induction system, a load detection system or the like.

The display 20 is a display device such as a liquid crystal display, an organic EL display, an inorganic EL display or the like. The display 20 is provided at the back side of the panel 10. The display 20 is disposed on the back face of the panel 10. The display 20 may be disposed at a distance from the panel 10 and supported by the housing of the electronic device 1.

The piezoelectric element 30 is formed by elements that, upon application of an electric signal (voltage), either expand and contract or flex in accordance with the electromechanical coupling coefficient of their constituent material. Ceramic or crystal elements, for example, are used. The piezoelectric element 30 may be a unimorph, bimorph or laminated piezoelectric element. A laminated piezoelectric element includes a laminated unimorph element with layers of unimorph (for example, 16 or 24 layers) and a laminated bimorph element with layers of bimorph (for example, 16 or 24 layers). Such a laminated piezoelectric element is constituted by a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph flexes upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of the housing 60 by a predetermined distance. The piezoelectric element 30 is preferably separated from the inner surface of the housing by the predetermined distance even when expanding and contracting or flexing. In other words, the distance between the piezoelectric element 30 and the inner surface of the housing 60 is preferably larger than the maximum amount of deformation of the piezoelectric element 30.

The input unit 40 accepts operation input from the user and is constituted, for example, by operation buttons (operation keys). Note that when the panel 10 is a touch panel, the panel 10 can also accept operation input from the user by detecting a touch by the user.

The controller 50 is a processor that controls the electronic device 1. The controller 50 applies a predetermined electric signal (a voltage corresponding to an audio signal) to the piezoelectric element 30. The maximum voltage of the electric signal that the controller 50 applies to the piezoelectric element 30 may, for example, be ±15 V. This is higher than ±5 V, i.e. the applied voltage of the so-called panel speaker for conduction of air-conducted sound, not vibration sound. In this way, even if the user presses the panel 10 against the user's body with, for example, a force of 3 N or greater (e.g. 5 N to 10 N), sufficient vibration is generated in the panel 10, so that a vibration sound can be generated via a part of the user's body. Note that the magnitude of the applied voltage used may be appropriately adjusted for the fixation strength of the panel, the performance of the element and other such factors.

When the controller 50 applies an electric signal to the piezoelectric element 30, the piezoelectric element 30 undergoes expansion and contraction or flexure in a longitudinal direction. At this point, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member which is later described. Thus, the panel 10 generates air-conduction sound, and the panel 10 also generates vibration sound that is transmitted through a part of the body when the user places the part of the body (e.g. the cartilaginous portion of the external ear) in contact with the panel 10. The controller 50 may apply, for example, an electric signal corresponding to a sound signal representing voice of a party on the phone, so as to generate air-conduction sound and vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like via the network.

The panel 10 undergoes flexure vibration not only in the region in which the piezoelectric element 30 is attached, but also in a region separate from the attachment region. In the region of vibration, the panel 10 includes a plurality of locations at which the panel 10 vibrates in a direction intersecting the main surface of the panel. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10. The maximum voltage that the controller 50 applies to the piezoelectric element 30 may be ±15 V to prevent dampening of the above-described vibration of the panel 10 even if the user presses the panel 10 against the user's body with a force of, for example, 5 N to 10 N. Therefore, the user can hear sound by pressing the panel 10 against the ear at a region distant from the above-described attachment region of the piezoelectric element 30.

Figure 2:
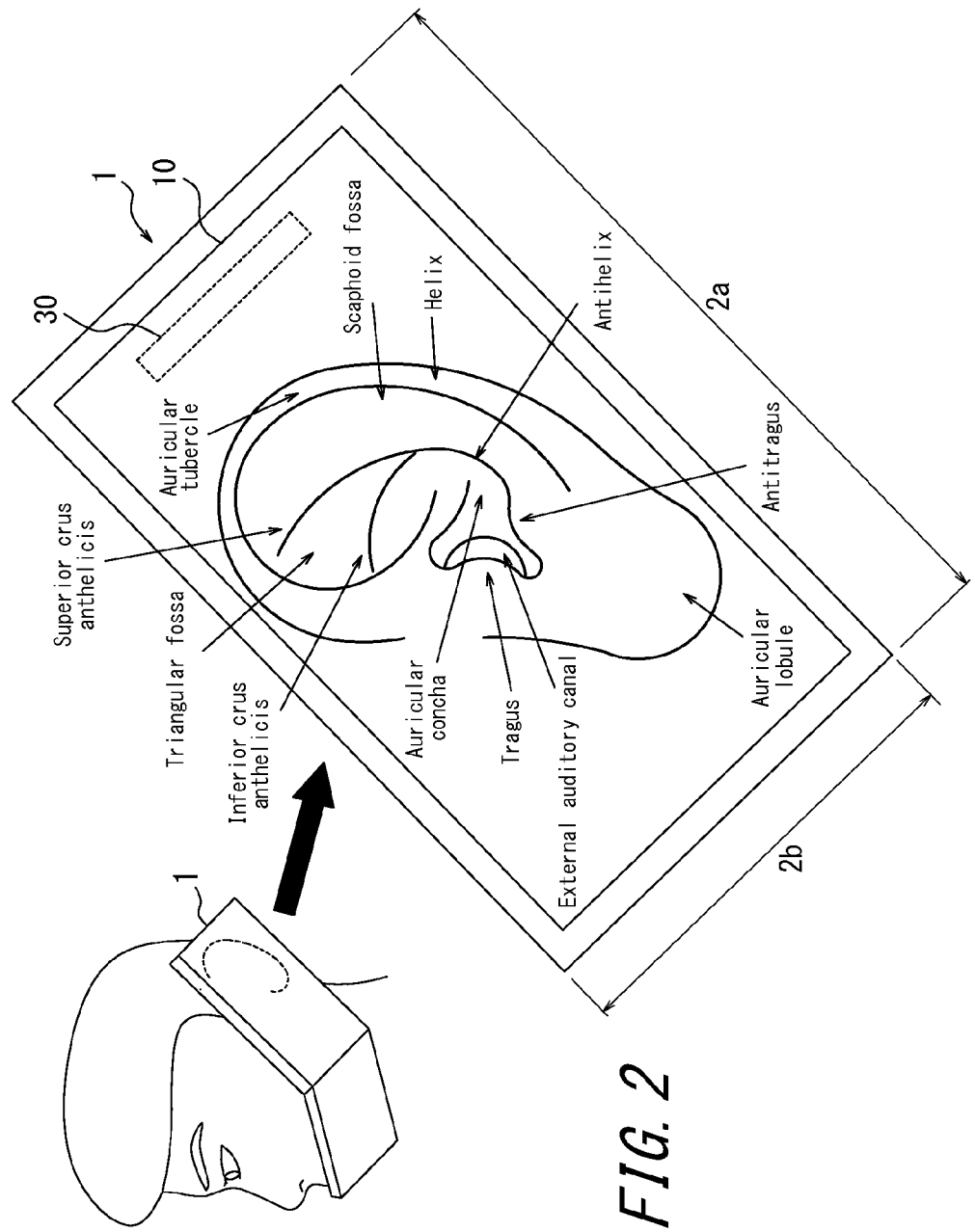
FIG. 2 illustrates a preferable shape of a panel.

It is to be noted that the panel 10 may be as large as the user's ear. As illustrated in FIG. 2, the panel 10 may also be larger than the user's ear. In this case, when the user listens to sound, the whole ear tends to be covered by the panel 10 of the electronic device 1. As a result, ambient sound (noise) is prevented from entering through the external auditory canal. The panel contacts or presumably contact an ear in an area of the panel 10 that is larger than an area having a length corresponding to a distance from an inferior crus of antihelix (i.e. an inferior crus anthelicis) to an antitragus and a width corresponding to a distance from a tragus to an antihelix. Hereafter, such an area of the panel 10 as to presumably contact a part of a human body (for example, ear) is referred to as a contact area. It is suffice for the vibration to occur in a contact area of the panel 10. It is preferable for the vibration to occur in a contact area of the panel 10 that is larger than a contact area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. A length direction herein refers to a longitudinal direction 2a along which the panel 10 extends, and the piezoelectric element 30 is disposed closer to one end relative to a middle of the panel 10 in the longitudinal direction 2a. A width direction refers to a direction 2b intersecting with the longitudinal direction. The contact area having the above length and width may have a rectangular shape or an elliptical shape with as a major axis corresponding to the length and a minor axis corresponding to the width. Average ear size of the Japanese can be seen from the Japanese Body Dimension Database (1992-1994) or the like distributed by the Research Institute of Human Engineering for Quality Life (HQL). The panel 10 with a size greater than or equal to the average ear size of the Japanese would be generally capable of covering a whole ear of a foreigner as well. With the aforementioned dimension and shape, the panel 10 is capable of covering the user's ear, which offers tolerance to misalignment when the user presses the panel 10 to the ear.

Figure 3:
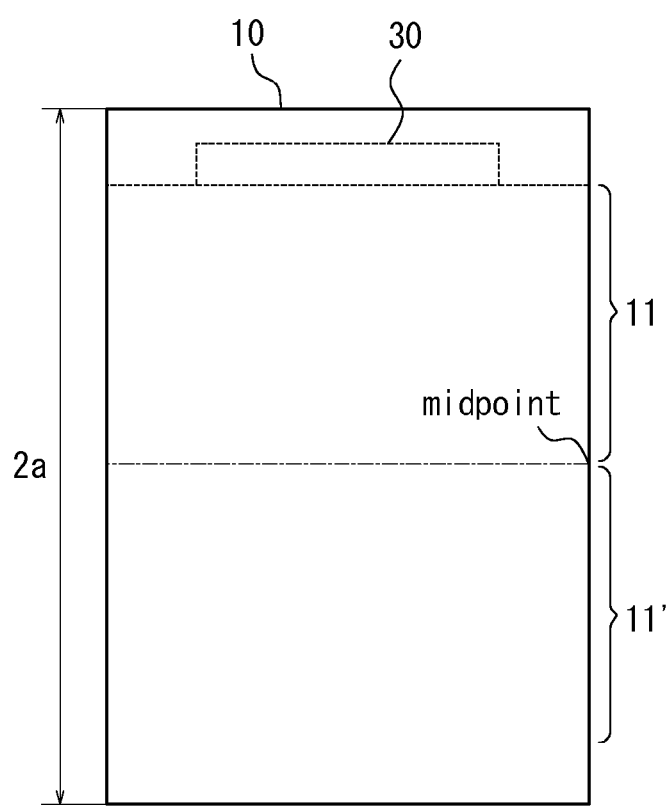
FIG. 3 illustrates a contact area.

With the above-described dimensions and shape, the panel 10 can cover the user's ear and has tolerance for misalignment when placed against the ear. As illustrated in FIG. 3, the contact area is intended to include the area 11 to the midpoint of the longitudinal direction 2a of the panel 10 from the lower end of the piezoelectric element 30 at a minimum. In the following, such the area 11 is explained as the contact area. The contact area may overlap, in a part of the panel 10, an attach area where the piezoelectric element 30 is attached. The contact area may include the entire attach area.

By vibration of the panel 10, the electronic device 1 can transmit vibration sound through a part of the user's body (such as the cartilage of the outer ear) and air-conducted sound to the user. Therefore, when sound is output at a volume equivalent to a conventional dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

Furthermore, the electronic device 1 transmits vibration sound by vibration of the panel 10, and therefore even if the user is wearing earphones or headphones, the user can hear sound through the earphones or headphones and through a part of the body by touching the electronic device 1 against the earphones or headphones.

The above electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by air but not liquid. Gore-Tex (registered trademark) is an example of a member permeable by air but not liquid.

First Embodiment

FIGS. 4A and 4B illustrate the housing structure of the electronic device 1 according to a first embodiment. FIG. 4A is a front view, and FIG. 4B is a sectional view taken along a line b-b of FIG. 4A. The electronic device 1 illustrated in FIGS. 4A and 4B is a smartphone in which the touch panel, i.e., a glass plate, is disposed on a front surface of a housing 60 (e.g. a metal or a resin casing).

The panel 10 is supported on the display 20 by the support 42, and the display 20 is supported, being joined to the insert sheet metal 46 of the housing 60, by the joining member 44. For example, the support 42 is an elastic member such as an effervescent sponge. By the support 42, dust and water is inhibited from entering between the display 20 and the panel 10. Also, for example, the joining member 44 may be an adhesive or double-sided tape. In addition, the input unit 40 may be supported in the housing 60. The piezoelectric element 30 is adhered to the panel 10 by a joining member 70. Note that the joining member 70 may be the adhesive agent, the double-sided adhesive tape, or the like having thermosetting properties, ultraviolet-curable properties, or the like. For example, the joining member 70 may be an optical elastic resin, which is a colorless and transparent ultraviolet-curable acrylic adhesive agent. The panel 10, the display 20, and the piezoelectric element 30 each have a substantially rectangular shape.

The display 20 is disposed in substantially a middle of the panel 10 in a short-side direction thereof. The piezoelectric element 30 is disposed near an end of the panel 10 in the longitudinal direction of the panel 10 at a predetermined distance from the end such that the longitudinal direction of the piezoelectric element 30 extends along a short side of the panel 10. The display 20 and the piezoelectric element 30 are disposed side by side in a direction parallel to a surface of an inner side of the panel 10.

Here, with reference to FIG. 5, supporting structure of the panel 10 will be described. FIG. 5 schematically illustrates an exploded view of the panel portion of the electronic device 1. In the housing 60, an insert sheet metal 46 such as aluminum is inserted and fixed. A joining member 44 is attached in the stack to the insert sheet metal 46. Here, the joining member 44 is a double-sided tape, and is disposed along the periphery of the display 20 to be stacked thereon. The display 20 is joined to the insert sheet metal 46 by the joining member 44. A support 42 is disposed on the display 20 along the periphery thereof. In this case, the support 42 may be a sponge. The panel 10 is attached in the stack to the support 42. In addition, the panel 10 and the display 20 are adhered by adhesive agent and the like, and so are the support 42 and the panel 10. Incidentally, the piezoelectric element 30 is attached to the panel 10 at a position not overlapping the display 20 (the support 42).

The support 42 may be an elastic member such as an effervescent sponge. For example, the support 42 may be a microcell polymer sheet (micro-cell polyurethane foam) having uniform cell structure of a high density. The microcell polymer sheet is configured foam body being supported on a PET base. For example, the foam structure of the foam body is a closed cell structure, but is not limited thereto.

Figure 6A:
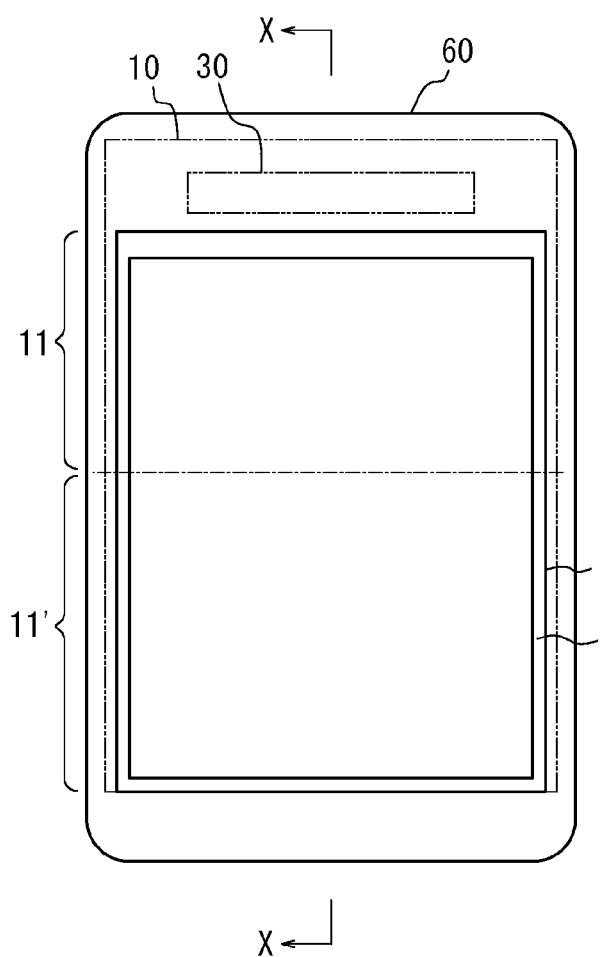
FIGS. 6A and 6B illustrate an example of a support.
Figure 6B:
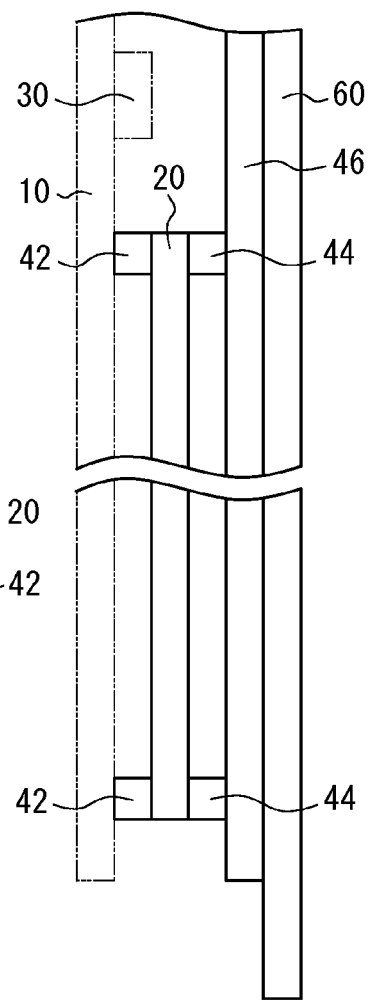

FIGS. 6A and 6B are diagrams for illustrating the support 42. In FIGS. 6A and 6B, the arrangement of the support 42 in the housing 60 is depicted. To the panel 10, pressure from the housing 60 is applied through the support 44. For example, in a partial cross-sectional view at X-X illustrated in FIG. 6A, the pressure from the housing 60 is applied through the support 42 to the panel 10 through the layered structure such as, in order from the back side, the housing 60, the insert sheet metal 46, the joining member 44, the display 20, the support 42 and the panel 10. The vibration of the panel 10 caused by the piezoelectric element 30, when transmitted to the contact area 11 in the longitudinal direction of the panel 10, is attenuated at a portion subjected to pressure from the support 42 which is disposed in the vicinity of the piezoelectric element 30. Here, in the first embodiment, other area that is different from the contact area 11, for example, pressure from the housing 60 at the contact area 11 of the panel 10 is smaller than the pressure from the housing 60 at the different area from the contact area 11, such as a area 11' of the lower part of the panel 10. For example, the pressure from the housing 60 in a area 11' is pressure applied from the housing 60 through the support 42 at the area 11'. Thereby, it is possible to prevent the vibration from being too attenuated, so that a preferable sound pressure is obtained in the vibration sound and air conduction sound of the panel 10. In the following, detailed examples will be described.

FIRST EXAMPLE

Figure 7A:
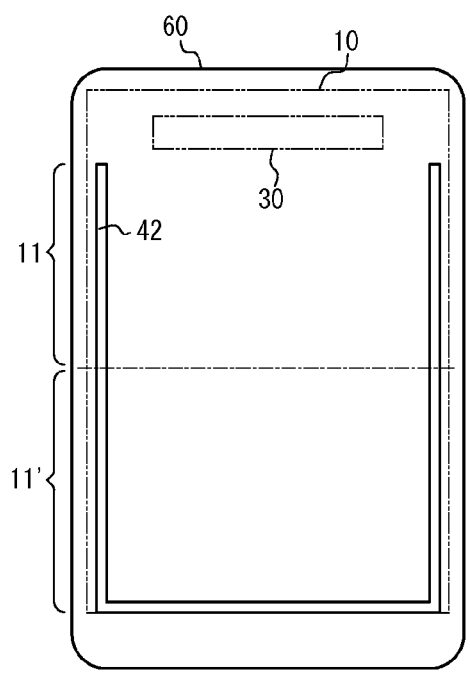
FIGS. 7A-7D illustrate an embodiment of the electronic device.
Figure 7B:
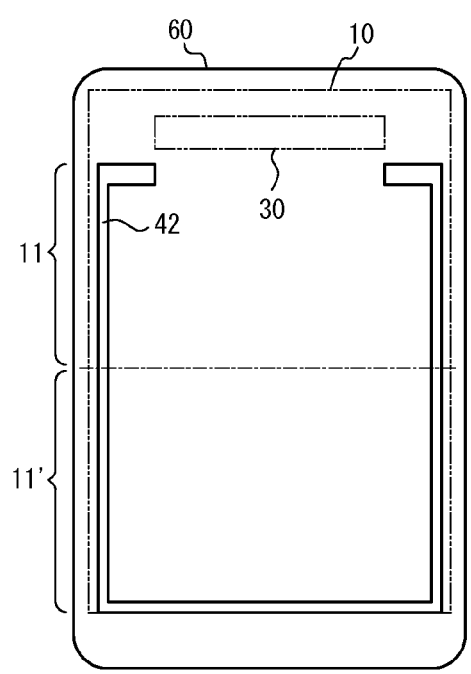

FIGS. 7A-7B are diagrams illustrating a first example. In the first example, the electronic device 100 has the support 42 for supporting the panel 10 in the area 11' different from the contact area 11, but has no support at the contact area 11 for supporting the panel 10 with an elastic force greater or equal to that of the support 42. For example, as illustrated in FIGS. 7A and 7B, a part of the support 42 is not provided at the contact area side 11. Preferably, as illustrated in FIG. 7A, a side of the upper end portion nearest to the piezoelectric element 30 may be omitted. Alternatively, as illustrated in FIG. 7B, a portion of one side of the upper end portion also may be omitted. The position of the portion to be omitted is preferably a portion closest to the piezoelectric element 30, but not limited to the example described here. Further, the length of the portion is preferably greater than or equal to the length in the longitudinal direction of the piezoelectric element 30. Thereby, the pressure from the housing 60 which attenuates the vibrations from the piezoelectric element 30 may be reduced. Further, even if omitting the part or entirety of one side of the upper portion of the support 42, the display 20 and the panel 10 are joined through a portion of the remaining portion, and, therefore, internal pressure overall on the support 42 is maintained to the extent necessary to protect the LCD of the display 20 from a shock when the electronic device 100 is dropped.

Figure 7C:
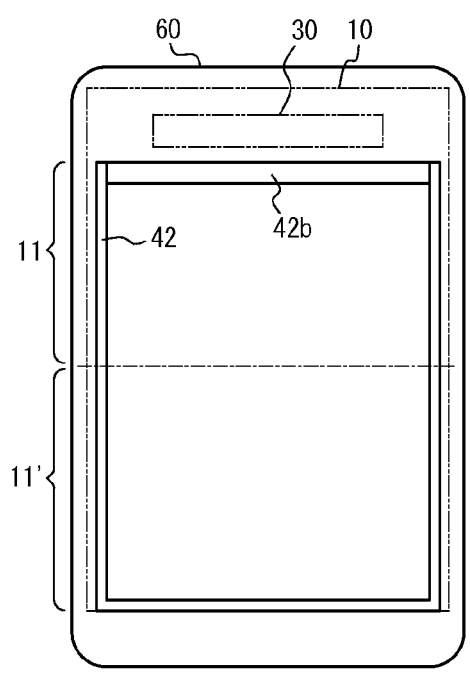
Figure 7D:
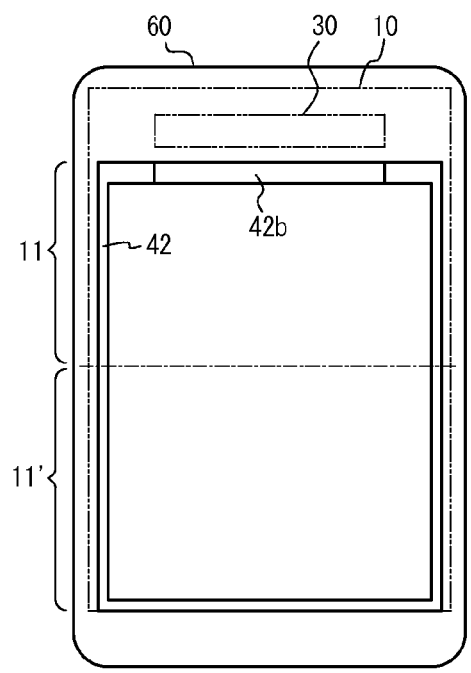

Further, for example, as illustrated in FIGS. 7C and 7D, the panel 11 is supported by a support 42b, which is more deformable than the support 42, in the contact area side 11. For example, the support 42b is formed using appropriately sponge more easily deformed than the sponge used in the support 42. For example, the support 42b is a thin layer clean foam comprising a polyolefin based foam. The ease of deformation is measured, for example, by penetrometer or spring type hardness tester compliant with JIS standard. It is sufficient that the support 42b is more easily deformed than the support 42, not being limited to the clean form a thin layer above. the support 42b may be microcell polymer sheet of the same kind as the support 42, and may be thinner than the support 42.

Preferably, as illustrated in FIG. 7C, the support 42b may be used at the side of the upper portion closest to the piezoelectric element 30. Alternatively, as illustrated in FIG. 7D, it may be used at a part of one side of the upper portion. The position of the support 42 being used is not limited to the example illustrated here, but preferably closest to the piezoelectric element 30. Further, the length thereof is preferably greater than or equal to the length in the longitudinal direction of the piezoelectric element 30. Thereby, the pressure from the housing 60 which attenuates the vibrations from the piezoelectric element 30 is reduced. Examples of FIGS. 7C and 7D, in comparison to FIGS. 7A and 7B, are more advantageous in preventing the entry of foreign matter into between the display 20 and the panel 10.

Figure 8A:
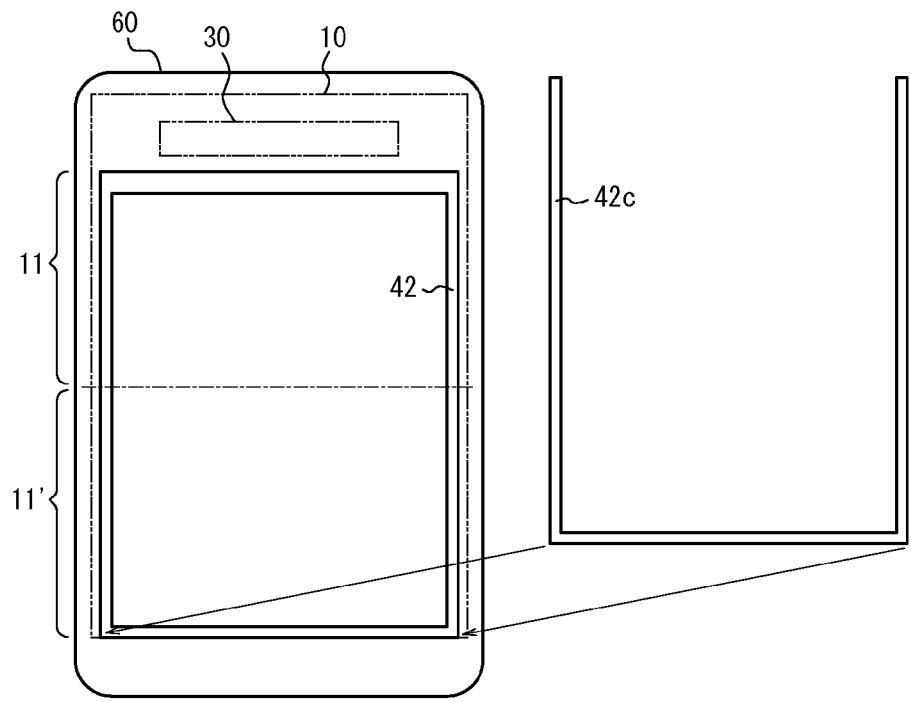
FIGS. 8A and 8B illustrate an example of the support.

Further, for example, as illustrated in FIG. 8A, the rigid member 42c except for the portion corresponding to the contact area 11 may be may be stacked on the support 42. The rigid member 42c is, for example, a PET sheet in shape of "U", omitting the side of the upper portion, which has a size to be superimposed on the support 42. In the portion where the rigid member 42c are stacked, the support 42 is compressed by the thickness of the rigid member 42c when the panel 10 being attached, and the internal pressure of the support 42c relatively increases. On the other hand, in the portion of the region 11' where the rigid member 42c is not stacked, the internal pressure is relatively low. Therefore, the pressure from the housing 60 is reduced in the vicinity of the piezoelectric element 30 of the contact area 11, the vibration of the panel 10 is less likely to be inhibited.

Figure 8B:
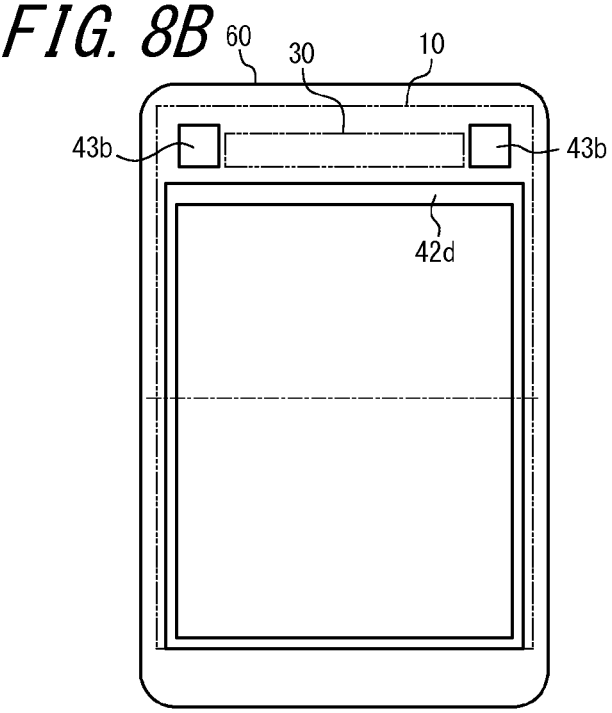

Alternatively, as illustrated in FIG. 8B, the rigid member 42d may be stacked (adhesive) in the vicinity of the piezoelectric element 30 around the contact area 11, while using the whole the support 42 as a whole. The rigid member 42d is, for example, a slice of PET sheet. For example, the dimensions of the rigid member 42d is a rectangular shape having the side length of the short-side of the piezoelectric element 30. In addition, the thickness of the rigid member 42d is preferably such that the internal pressure of the support 42 in the contact area 11 becomes relatively lower than the internal pressure in the other area 11' by the rigid member 42d supporting the panel 10. Further, instead of adding a PET sheet or the like, the rigid member may be formed on the housing 60 side by, for example, molding protrusions on the insert sheet metal. By providing such the rigid member, the pressure from the housing 60 which attenuates vibrations from the piezoelectric element 30 may be reduced. As illustrated in FIG. 8B, when placing the rigid member 42d between the housing 60 and the panel 10, it is preferable to place an elastic member such as a double-sided tape or a sponge between the rigid member 42d and the panel 10. Thereby, chattering sound caused by the rigid member 42d and the panel 10 being brought into contact when the panel 10 is vibrated.

SECOND EXAMPLE

Figure 9:
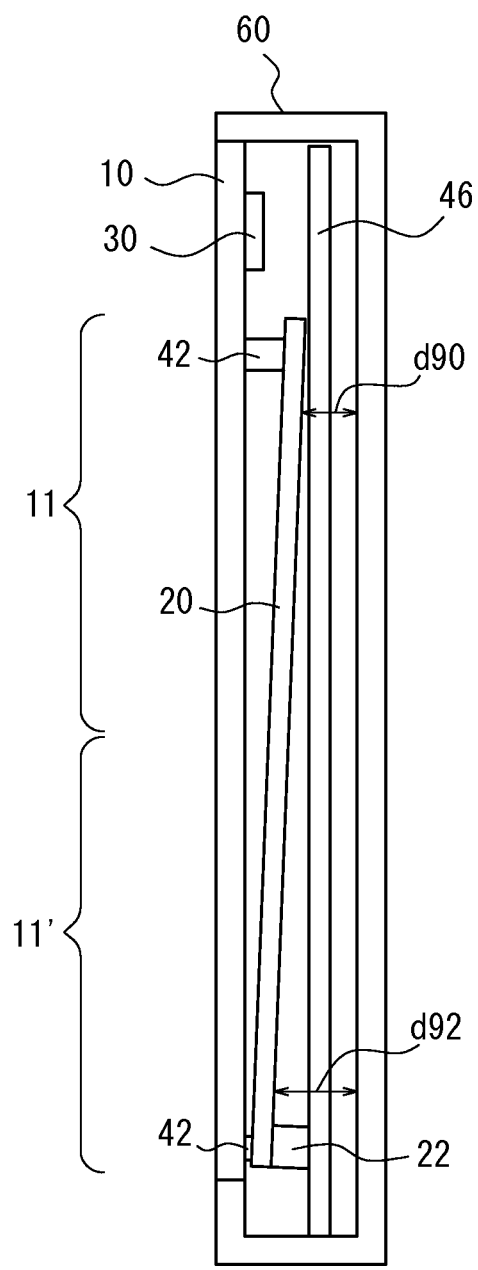
FIG. 9 illustrates an embodiment of the electronic device.

FIG. 9 illustrates a schematic cross-sectional view in the longitudinal direction of the electronic device 1 in a second example. In the second example, the housing 60 has an elastic member (support 42) that supports the panel 10 from the interior member (display 20), and distance d90 between the housing 60 and the display 20 in the contact area 11 is smaller than the distance d92 between the housing 60 and the panel 10 in other region 11'. Thereby, when the panel 10 is attached, the pressure to compress the support 42, i.e. a sponge, is weakened at the contact area 11 comparing to the region 11', and the pressure to be applied on the panel 10 from the support 42 as a reaction may be weakened. Therefore, the pressure from the housing 60 which attenuates vibrations from the piezoelectric element 30 may be reduced. Incidentally, in the second example, thickness of the support is assumed to be constant.

For more concrete example, the interior member (the display 20) has a support 22 which supports the display 20 from the housing 60 (for example, the insert sheet metal 46 attached to the housing 60) such that the display is inclined towards the panel 10 in the other region 11'. By the support 42, the display 20 compresses the support 22 while inclined towards the panel 10 in the other area 11'.

Figure 10:
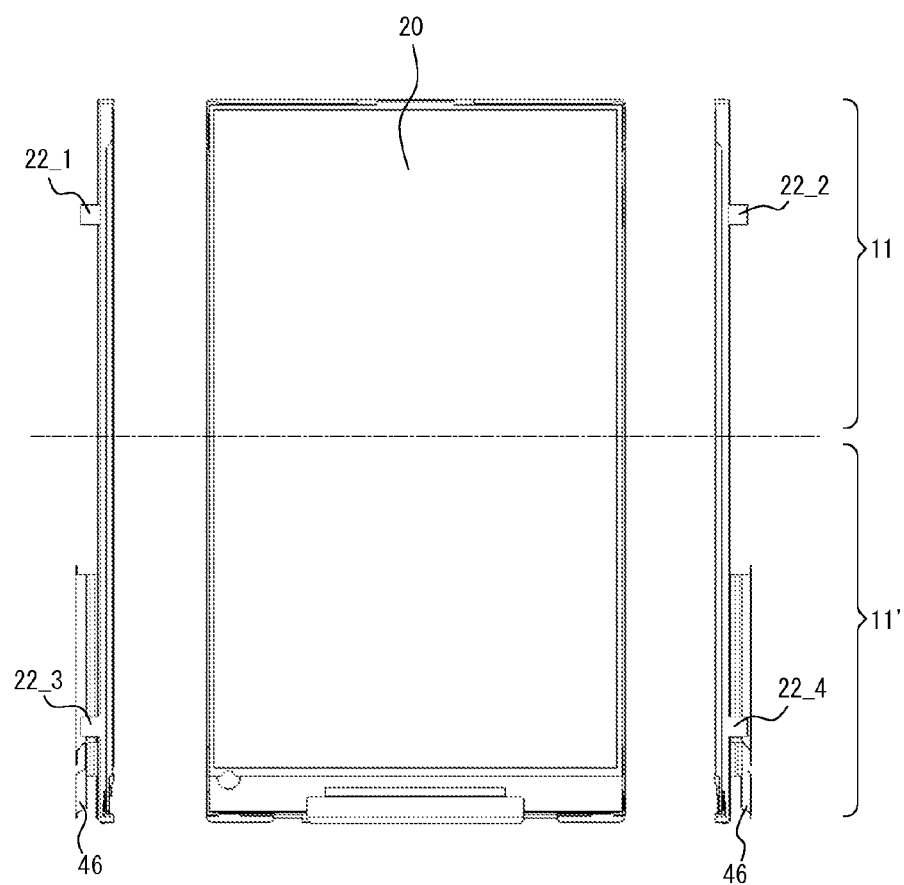
FIG. 10 illustrates a support.

FIG. 10 is a diagram illustrating a more concrete example of the support 22. In FIG. 10, a structure example of a LCD (Liquid Crystal Display) module corresponding to the display 20 is illustrated in both front and side views. The display 20 has claw portions 22_1-22_4 corresponding to the support 22. The claw portions 22_1-22_4 abut the insert sheet metal 46 on the side of the display 20 to separate the display 20 from the insert sheet metal 46. Here, the heights of the claw portions 22_3 and 22_4 corresponding to other area 11' are taller than the heights of the claw portions 22_1 and 22_2. Thereby, a distance from the display 20 to the insert sheet for metal 46 may be made larger at the other area 11' than at the contact area 11. Therefore, the display 20 may tilt towards the panel 10 in the other area 11' and the support 42 may be compressed.

Incidentally, by providing the claw portions 22_1-22_4 on the side surface of the LCD module instead of the top or bottom portion thereof, chattering sound caused by the vibration transmitted along the longitudinal direction of the panel 10 may be suppressed.

FIGS. 11A and 11B illustrate an alternative example of the support 22. In FIGS. 11A and 11B, an example of the joining member 44 which joins the insert sheet metal 46 to the display 20 is schematically illustrated in the plan view of the housing 60. Here, the joining member 44 is a double-sided tape having a certain thickness. For example, as illustrated in FIG. 11A, a portion of the joining member 44, preferably one side of the upper portion closest to the piezoelectric element 30, is omitted on the side of the contact area 11. Further, preferably, as illustrated in FIG. 11B, on the side of the contact area 11, a thin double-sided tape is used as a joining member 44b is used instead of the joining member 44. Thereby, the distance from the display 20 to the insert sheet metal 46 may be made larger at the other area 11' than at the contact area 11. Thereby, the display 20 is inclined towards the panel 10 in the other area 11' and compresses the support 42 when the panel 10 being attached.

The structure for tilting the display 20 and the panel 10 relatively towards each other is not limited to the above. For example, the height of the part where the panel 10 is attached (wall forming the outer periphery of the housing 60) may be formed such that the height from the bottom surface of the housing 60 progressively lowers from one end of the panel 10 where the piezoelectric element 30 is attached towards the other end. Then, by placing the display 20 in parallel to the bottom surface of the housing 60 and placing the panel 10 on the wall of the housing 60, the display 20 and the panel 10 are made tilt relative to each other.

Figure 12:
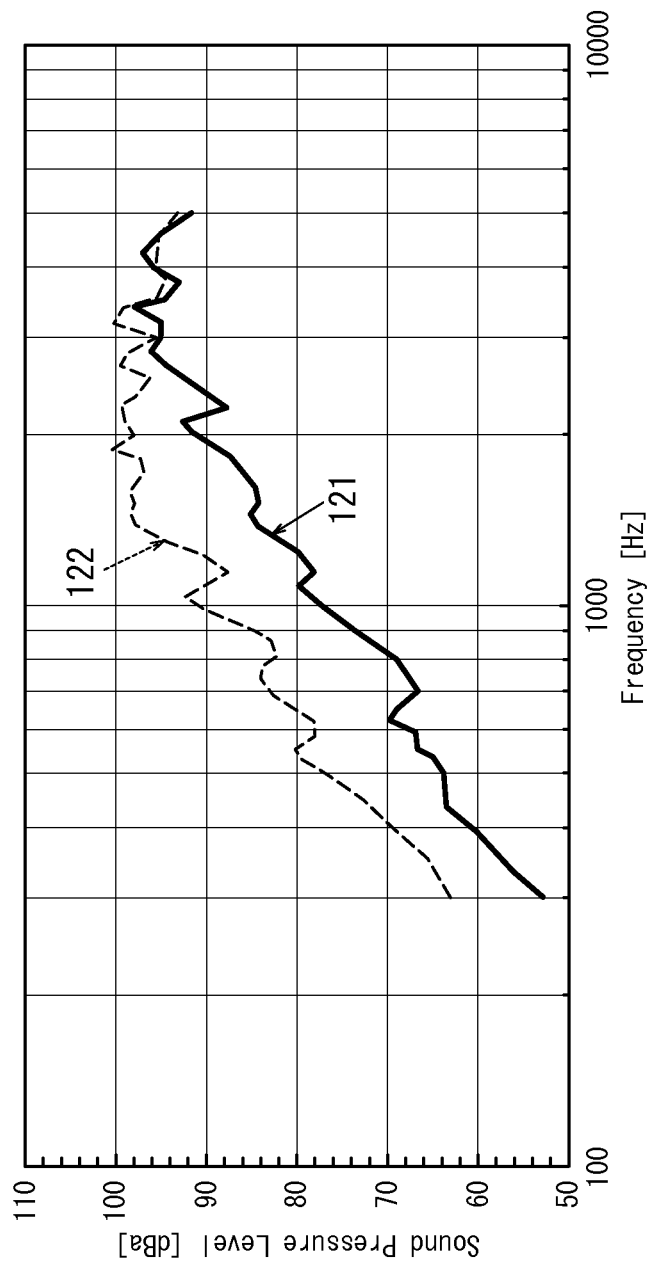
FIG. 12 illustrates a frequency characteristic of a panel.

FIG. 12 is a diagram illustrating a frequency characteristic of the panel 10 in the first exemplary embodiment. In FIG. 12, in comparison with a frequency characteristic 121 in the case of uniform pressure is applied to the panel 10, a frequency characteristic 122 of the panel 10 in the case of the pressure from the housing in the contact area being weaken is illustrated. The vertical axis represents sound pressure, and the horizontal axis represents frequency. As depicted, the sound pressure characteristic is improved over the whole frequency, when the pressure from the housing in the contact area is weakened.

Figure 13A:
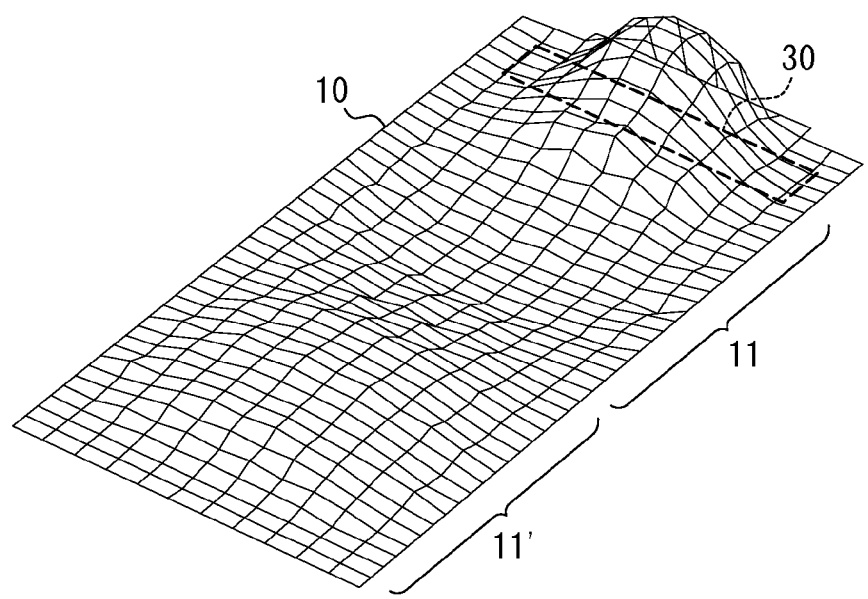
FIGS. 13A and 13B illustrate an example of vibration of a panel of the electronic device according to the first embodiment.
Figure 13B:
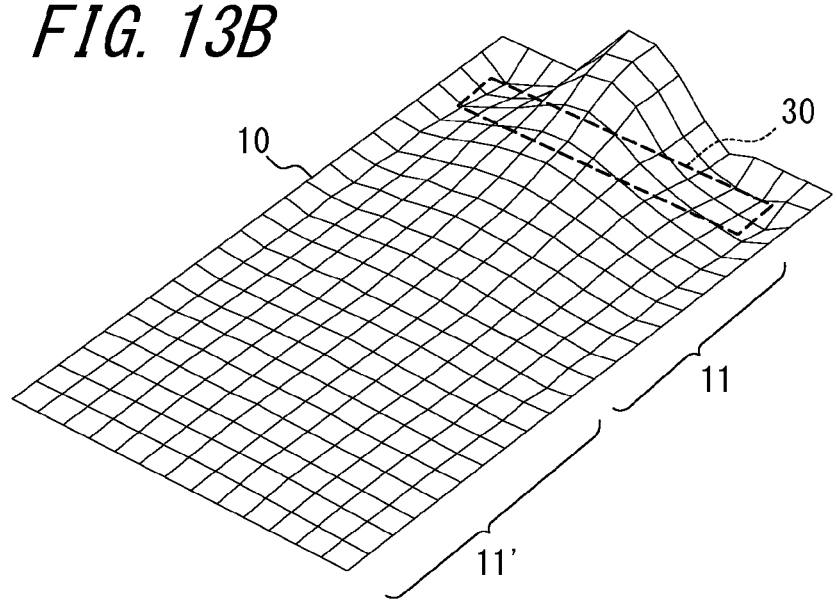

FIGS. 13A and 13B illustrate one example of the vibration of the panel 10 of the electronic device 1 according to the first embodiment. In FIGS. 13A and 13B, in comparison to a case that uniform pressure is applied to the panel 10 (FIG. 13A), an example of vibration of the panel 10 when weakening the pressure from the housing in the contact area (FIG. 13B) is illustrated. In the panel 10, the upper part is bent directly by the piezoelectric element 30, and the vibration is attenuated in the lower part compared to the upper part. The panel 10 is bent by the piezoelectric element 30, such that a part immediately above the piezoelectric element 30 is raised higher than its surrounding parts in the longitudinal direction of the piezoelectric element 30. When uniform pressure is applied from the housing to the panel 10, the lower part of the panel 10 is less likely to vibrate than the upper part of the panel 10 where the piezoelectric element 30 is attached. In the case of reducing the pressure from the housing, the vibration is generated in an area of the panel 10 where the piezoelectric element 30 is disposed and in areas of the panel 10 that are away from the disposed area. Here, for example, a case is illustrated that the vibration is transmitted along the longitudinal direction 2a of the panel 10 without being attenuated as much as the case of FIG. 13A. Accordingly, the user is able to hear air conduction sound transmitted through air and to hear human body vibration sound by placing the ear in contact with any position of the panel 10.

As such, according to the electronic device 1 according to the present exemplary embodiment, the panel 10 is deformed by the deformation of the piezoelectric element 30 attached to the back of the panel 10, and the vibration sound and air conduction sound is transmitted to an object in contact with the panel 10 being deformed. Thereby, the vibration sound and air conduction sound may be transmitted to the user without having a vibrating body protrude to the outer surface of the housing 60, and thus ease of use is improved compared to the electronic device described in Patent Literature 1, which is used such that much smaller vibrating body than the housing is in contact with a human body. In addition, it is not necessary to have the piezoelectric element 30 in contact with the user's ear, and thus it is less likely the piezoelectric element itself is broken. Further, comparing to the case of deforming the housing 60 rather than the panel 10, it is less likely that the user easily drops the device when vibration being generated in the case of vibrating the panel 10.

In addition, the piezoelectric element 30 is joined by the joining member 70 to the panel 10. Thereby, the piezoelectric element 30 may be attached to the panel 10 in a manner that the freedom of the deformation of the piezoelectric element 30 is less likely to be inhibited. Further, the joining member 70 may be a non-thermosetting adhesive agent. Thereby an advantageous effect is obtained that, during curing, thermal shrinkage stress is hardly generated between the panel 10 and the piezoelectric element 30. In addition, the joining member 70 may be a double-sided tape. There is an advantage Accordingly, it is advantageous that shrinkage stress as with the case of adhesive agent being used is hardly applied between the panel 10 and the piezoelectric element 30.

Second Embodiment

Figure 14A:
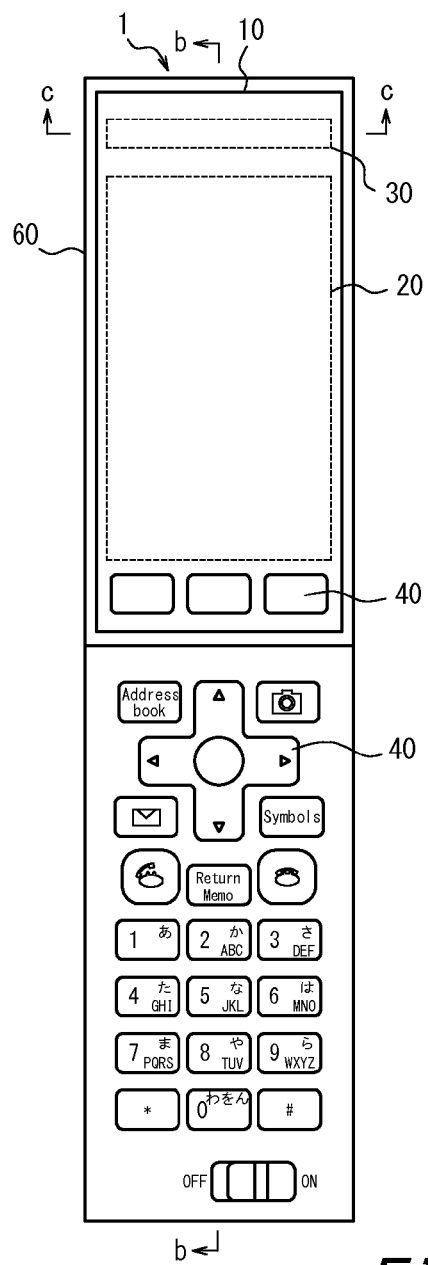
FIGS. 14A-14C illustrate a housing structure of the electronic device according to a second embodiment.
Figure 14B:
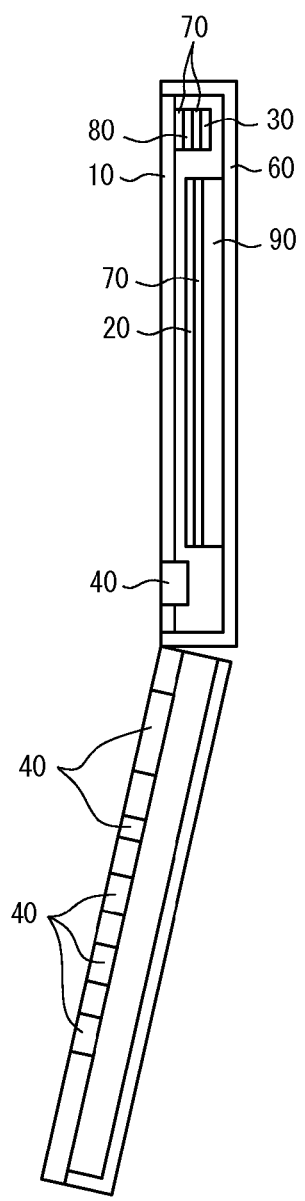
Figure 14C:
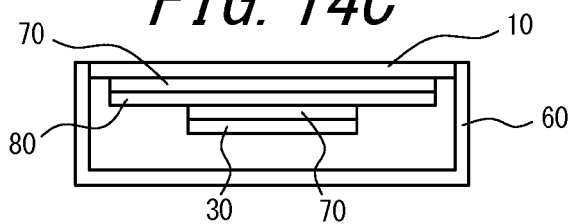

FIG. 14 schematically illustrates parts of a housing structure of the electronic device 1 according to the second embodiment. FIG. 14(a) is a front view, FIG. 14(b) is a cross-sectional view along the b-b line of FIG. 14(a), and FIG. 14(c) is a cross-sectional view along the c-c line of FIG. 14(a). The electronic device 1 illustrated in FIG. 14 is a clamshell mobile phone in which a cover panel (an acrylic plate) protecting the display 20 is disposed on the front face of an upper housing 60 as the panel 10. In the second embodiment, a reinforcing member 80 is disposed between the panel 10 and the piezoelectric element 30. The reinforcing member 80 is, for example, a resin plate, sheet metal, or a plate including glass fibers. In other words, in the electronic device 1 according to the second embodiment, the piezoelectric element 30 and the reinforcing member 80 are adhered by the joining member 70, and furthermore the reinforcing member 80 and the panel 10 are adhered by the joining member 70. Furthermore, in the second embodiment, the display 20 is supported by the housing 60. Specifically, in the electronic device 1 according to second embodiment, the display 20 is adhered by the joining member 70 to a support 90, which is a portion of the housing 60. Note that the support 90 is not restricted to being a portion of the housing 60 and may be a member formed from metal, resin or the like and independent from the housing 60a.

Further, in the second exemplary embodiment, the display 20 is supported by the housing 60. That is, the electronic device 1 according to the second embodiment has a structure in which the support 90 as a part of the housing 60 and the display 20 are joined by the joining member 70. The support 90, may be configured as, not limited to a part of the housing 60, but as an independent member from the housing 60 by a resin or metal.

In the case of such a structure, the first and second examples of the first embodiment are applicable to attaching the panel 10. Thereby, the sound pressure characteristic of the panel 10 at the contact area may be improved.

As such, according to the electronic device 1 of the second embodiment, the panel 10 is deformed by the deformation of the piezoelectric element 30 attached through the reinforcing member 80 to the panel 10, and the vibration sound and air conduction sound is transmitted to an object in contact with the panel 10 being deformed. Thereby, a vibration sound and an air conduction sound may be transmitted to the user without having a vibrating body in contact with the user's ear. In addition, the piezoelectric element 30 is attached to surface within the housing 60. Thereby, without having to have a vibrating body protrude to the outer surface of the housing 60, a vibration sound and an air conduction sound may be transmitted to the user. Furthermore, the panel 10 is deformed not only in an attach area where the piezoelectric element 30 is attached but also in every portion, to transmit a vibration sound and an air conduction sound. Thereby, the user can, in addition to the air-conduction sound going through the air, to listen to the vibration sound by having the ear contact an arbitrary position of the panel 10.

Disposing the reinforcing member 80 between the piezoelectric element 30 and the panel 10 can reduce the probability of an external force being transmitted to and damaging the piezoelectric element 30 if, for example, such a force is applied to the panel 10. Moreover, even if the panel 10 is pressed firmly against the user's body, vibrations of the panel 10 do not dampen easily. By disposing the reinforcing member 80 between the piezoelectric element 30 and the panel 10, the resonance frequency of the panel 10 also decreases, thereby improving the acoustic characteristic in the low frequency band. Note that instead of the reinforcing member 80, a plate-shaped anchor may be attached to the piezoelectric element 30 by the joining member 70.

Although the present invention has been described by way of embodiments with reference to the accompanying drawings, it is to be noted that various changes and modifications will be apparent to those skilled in the art. Therefore, such changes and modifications are to be understood as included within the scope of the present invention. For example, the functions and the like included in the various member s and steps may be reordered in any logically consistent way. Furthermore, components or steps may be combined into one or divided.

Figure 15:
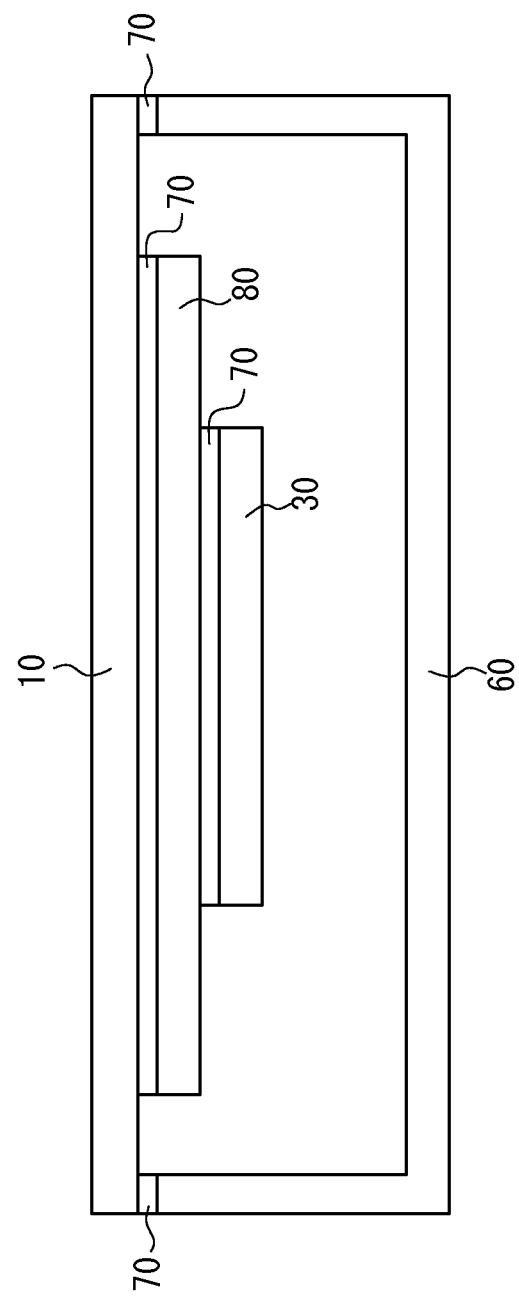
FIG. 15 illustrates joining of the panel and the housing.

For example, as illustrated in FIG. 15, the configuration may be available such that the panel 10 is joined by the joining member 70 to the housing 60. As such, the vibration from the panel 10 is not easily transmitted directly to the housing 60, compared with the case where the housing itself greatly vibrates, the risk that the user might drop n the electronic device 1 may be reduced. Further, the joining member 70 may be a non-thermosetting adhesive agent. Thereby, an advantage is obtained such that, during curing, thermal shrinkage stress is hardly generated between the panel 10 and the housing 60. In addition, the joining member 70 may be a double-sided tape. Thereby, an advantage is obtained such that shrinkage stress, such as adhesive use, is less likely to occur between the panel 10 and the housing 60.

For example, when the panel 10 and the display 20 do not overlap, the piezoelectric element 30 may be disposed at the center of the panel 10. When the piezoelectric element 30 is disposed at the center of the panel 10, vibration of the piezoelectric element 30 is transmitted across the entire panel 10, thereby improving quality of air-conducted sound and permitting recognition of vibration sound when the user's ear touches any of various positions on the panel 10. Similarly to the above embodiments, a plurality of piezoelectric elements 30 may also be provided.

The piezoelectric element 30 is attached to the panel 10 in the above electronic device 1 but instead may be attached to a location other than the panel 10. For example, the piezoelectric element 30 may be attached to the housing 60 or to a battery lid that covers a battery. Since the battery lid is often attached to a different face than the panel 10 in the electronic device 1 of a mobile phone or the like, according to this structure the user can hear sound by touching a part of the body (such as the ear) to a different face than the panel 10.

Furthermore, the panel 10 may constitute a portion or the entirety of any of a display panel, an operation panel, a cover panel, or a lid panel that allows for removal of a rechargeable battery. In particular, when the panel 10 is a display panel, the piezoelectric element 30 is disposed on the outside of a display region fulfilling a display function. This offers the advantage of not blocking the display. The operation panel includes the touch panel of Embodiment 1. The operation panel also includes a sheet key, in which the tops of operation keys are integrally formed in, for example, a clamshell mobile phone so as to constitute one face of the housing alongside an operation unit.

Note that in Embodiments 1 and 2, the joining member that adheres the panel 10 and the piezoelectric element 30 and the joining member or the like that adheres the panel 10 and the housing 60 have both been described as the joining member 70, using the same reference numeral. The joining member s used in Embodiments 1 and 2, however, may differ as needed in accordance with the components being joined.

The embodiments described above are summarized as Addition s as follows.

(Addition 1)

An electronic device comprising:

a housing;

a piezoelectric element; and a panel, which is attached to the housing and has a contact area contacting a part of human body, configured to vibrate by the piezoelectric element to generate an air-conduction sound and a vibration sound to be transmitted by vibrating the part of human body, wherein pressure from the housing at the contact area of the panel is smaller than pressure from the housing at different area from the contact area.

(Addition 2)

In the electronic device of Addition 1, the housing has a first support configured to support the panel at the different area and no support configured to support the panel with greater elastic force than that of the first support at the contact area.

(Addition 3)

In the electronic device of Addition 2, the housing has a second support configured to support the panel with smaller elastic force than that of the first support at the contact area.

(Addition 4)

In Addition 2, the housing supports the panel in the contact area by the first support and the first rigid member and in the different area by the first support (Addition 5)

In the electronic device of Addition 4, the housing supports the panel in the different area by the first support and by a second rigid member having less rigidity than the first rigid member.

(Addition 6)

In the electronic device of Addition, the housing has an elastic member to support the panel from an interior member within the housing, and a distance between the interior member and the housing at the contact area is greater than a distance between the interior member and the housing at the different area.

(Addition 7)

In the electronic device of Addition 6, the interior member supports the interior member from the housing such that the interior member tilts towards the panel in the different area.

(Addition 8)

In the electronic device of any of Addition s 1 though 7, the contact area has a length corresponding to a distance from an inferior crus antihelix to an antitragus and a width corresponding to a distance from a tragus to an antihelix.

(Addition 9)

In the electronic device of any of Addition s 1 though 8, the panel vibrates in the entire region thereof.

(Addition 10)

In the electronic device of any of Addition s 1 though 9, the piezoelectric element is disposed outside of overlapping area of the panel with a display.

Figure 16:
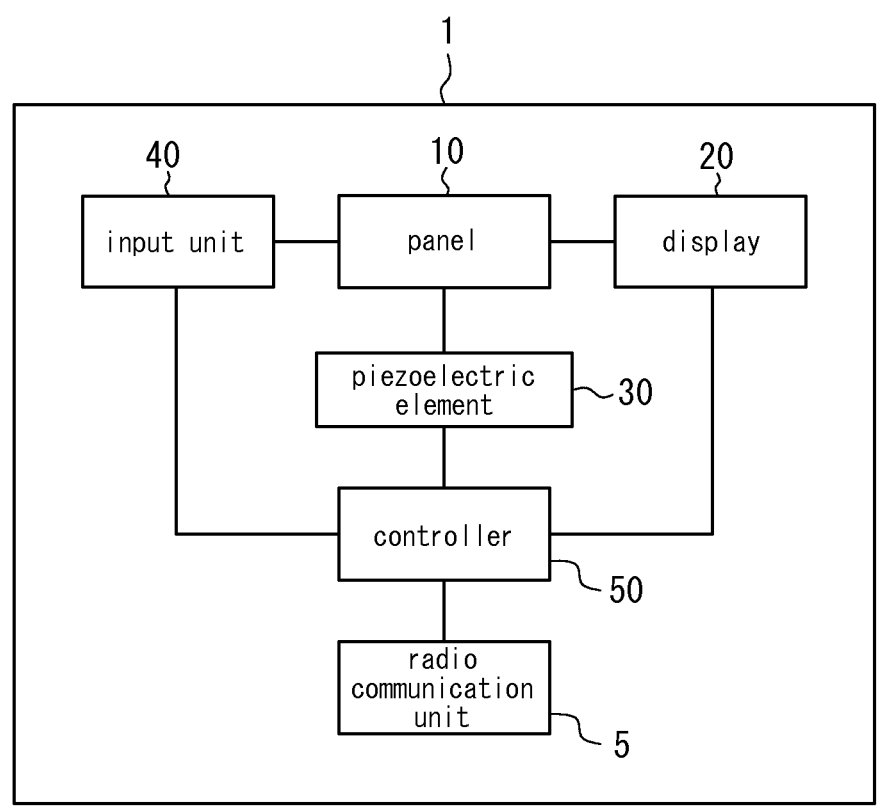
FIG. 16 is a function block diagram of an electronic device according to another embodiment of the present invention.
Figure 17:
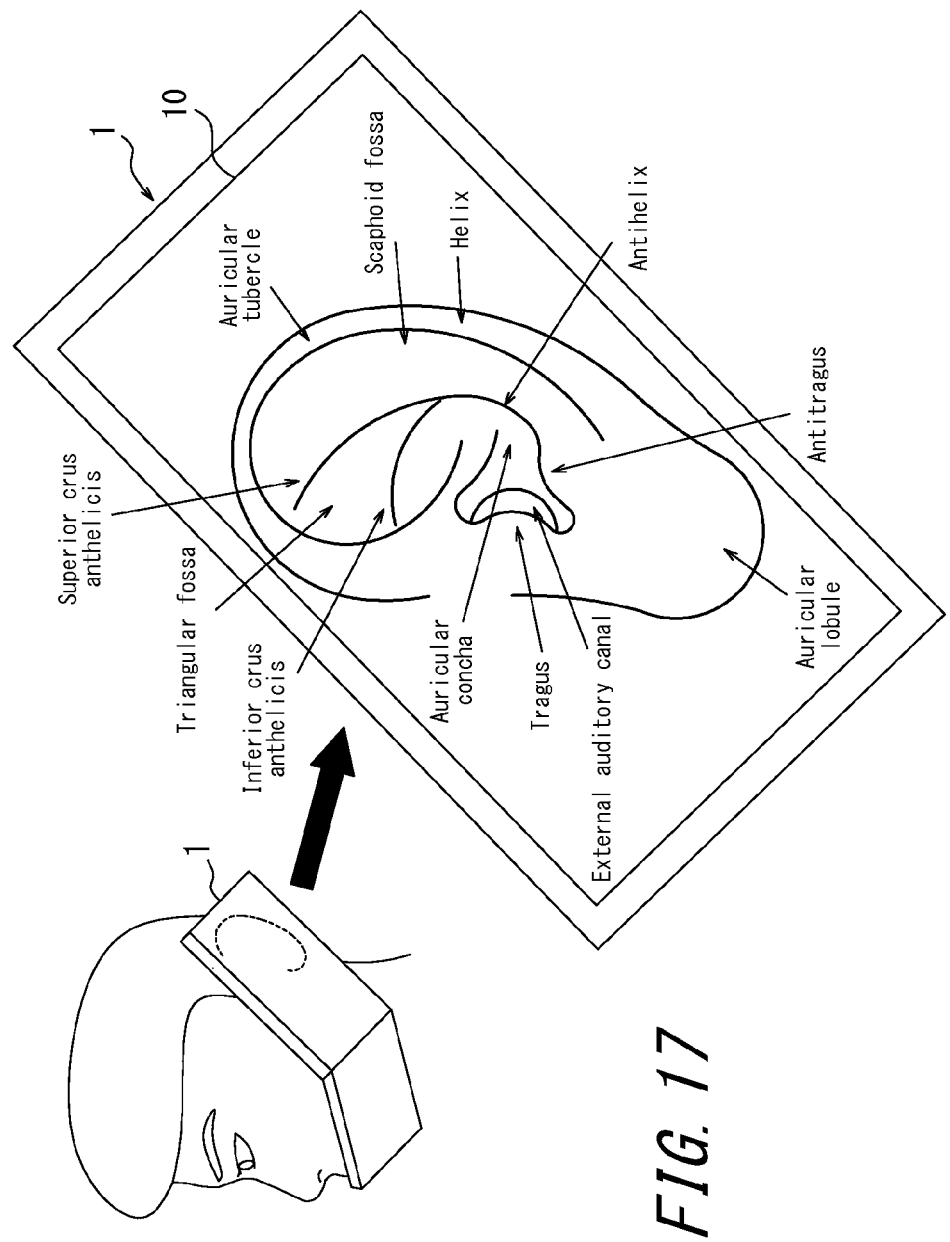
FIG. 17 illustrates a preferable shape of a panel.

Other embodiments of the present invention will be described with reference to the accompanying drawings. FIG. 16 is a function block diagram of an electronic device 1 according to one embodiment of the present invention. The electronic device 1, which is a mobile phone, for example, includes a radio communication unit 5, a vibration plate 100, a display 20, a piezoelectric element 30, an input unit 40, and a controller 50. The radio communication unit may have a known configuration and is connected wirelessly to a communication network via a base station and the like. If the electronic device 1 of the embodiments functions as the mobile phone, the acoustic device 100 generates sound which is transmitted to an inner part of a human body by a vibration of the panel 10 generated by the piezoelectric element 30. The sound to be transmitted to an inner part of the human body passes through a soft tissue of the human body (e.g. a cartilage) to vibrate a middle ear or an inner ear.

The panel 10, constituting a vibrating panel, is a touch panel that detects a touch or is a cover panel or the like that protects the display 20. The panel 10 is, for example, made from glass or a synthetic resin such as acrylic or the like. The panel 10 may be plate-like in shape, or a curved panel having smoothly curved surface. When the panel 10 is a touch panel, the panel 10 detects a touch by the user's finger, a pen, a stylus pen or the like. Any detection system may be used in the touch panel, such as a capacitive system, a resistive film system, a surface acoustic wave system (or an ultrasonic wave system), an infrared system, an electromagnetic induction system, a load detection system or the like.

The display 20 is a display device such as a liquid crystal display, an organic EL display, an inorganic EL display or the like. The display 20 is provided at the back side of the panel 10. The display 20 is disposed on the back face of the panel 10 by a joining member (for example, adhesive). The display 20 may be disposed at a distance from the panel 10 and supported by the housing of the electronic device 1.

The piezoelectric element 30 is formed by elements that, upon application of an electric signal (voltage), either expand and contract or flex in accordance with the electromechanical coupling coefficient of their constituent material. Ceramic or crystal elements, for example, are used. The piezoelectric element 30 may be a unimorph, bimorph or laminated piezoelectric element. A laminated piezoelectric element includes a laminated unimorph element with layers of unimorph (for example, 16 or 24 layers) and a laminated bimorph element with layers of bimorph (for example, 16 or 24 layers). Such a laminated piezoelectric element is constituted by a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph flexes upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of the housing 60 by a predetermined distance. The piezoelectric element 30 is preferably separated from the inner surface of the housing by the predetermined distance even when expanding and contracting or flexing. In other words, the distance between the piezoelectric element 30 and the inner surface of the housing 60 is preferably larger than the maximum amount of deformation of the piezoelectric element 30.

The input unit 40 accepts operation input from the user and is constituted, for example, by operation buttons (operation keys). Note that when the panel 10 is a touch panel, the panel 10 can also accept operation input from the user by detecting a touch by the user.

The input unit 40 is configured to receive an operation input from the user and is configured using an operation button (an operation key), for example. When the panel 10 is the touch panel, the panel 10 is also capable of receiving an operation input from the user by detecting a contact made by the user.

The controller 50 is a processor that controls the electronic device 1. The controller 50 applies a predetermined electric signal (a voltage corresponding to an audio signal) to the piezoelectric element 30. The maximum voltage of the electric signal that the controller 50 applies to the piezoelectric element 30 may, for example, be ±15 V. This is higher than ±5 V, i.e. the applied voltage of the so-called panel speaker for conduction of air-conducted sound, not human body vibration sound. In this way, even if the user presses the panel 10 against the user's body with, for example, a force of, e.g., 3 N or greater (5 N to 10 N), sufficient vibration is generated in the panel 10, so that a human body vibration sound can be generated via a part of the user's body. Note that the magnitude of the applied voltage used may be appropriately adjusted for the fixation strength of the panel, the performance of the element and other such factors.

When the controller 50 applies an electric signal to the piezoelectric element 30, the piezoelectric element 30 undergoes expansion and contraction or flexure in a longitudinal direction. At this point, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member 80 which is later described. Thus, the panel 10 generates air conduction sound, and the panel 10 also generates human body vibration sound that is transmitted through a part of the body when the user places the part of the body (e.g. the cartilaginous portion of the external ear) in contact with the panel 10. For example, the controller 50 may apply an electric signal corresponding to a sound signal representing voice of the party on the phone or the like, so as to generate air conduction sound and human body vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like via the network.

The vibration is caused in an area of the panel 10 where the piezoelectric element 30 is disposed and in other areas of the panel 10 that are away from the area where the piezoelectric element 30 is disposed. The panel 10 includes, in the areas vibrated, a plurality of portions that are configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed across the panel 10 at a certain moment. In other words, the vibration of a plurality of wavelengths is detected across substantially all areas of the panel 10. In order to prevent the aforementioned vibration of the panel 10 from being attenuated even when the user forcefully presses the panel 10 against the user's body with force ranging from 5 N to 10 N, for example, the voltage that the controller 50 applies to the piezoelectric element 30 may be ±15 V. The above configuration allows the user to listen to sound while placing the ear in contact with the areas of the panel 10 that are away from the area where the piezoelectric element 30 is disposed, such as the central part of the panel 10.

The panel 10 may be nearly the same size as the user's ear. As illustrated in FIG. 2, the panel 10 may also be larger than the user's ear. Adopting such a size makes it easier for the panel 10 of the electronic device 1 to cover the entire ear when the user listens to sound, thus making it difficult for surrounding sounds (noise) to enter the external ear canal. The region of the panel 10 that vibrates should be larger than a region having a length corresponding to the distance from the inferior antihelix crus to the antitragus and a width corresponding to the distance from the tragus to the antihelix. The region of the panel 10 that vibrates preferably has a length corresponding to the distance from a position in the helix near the superior antihelix crus to the earlobe and a width corresponding to the distance from the tragus to a position in the helix near the antihelix. The region with the above length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 10 is larger than the average size of a Japanese person's ear, it is thought that the panel 10 will be a size capable of covering the entire ear of most non-Japanese people. With the above-described dimensions and shape, the panel 10 can cover the user's ear and has tolerance for misalignment when placed against the ear.

By vibration of the panel 10, the electronic device 1 can transmit human body vibration sound through a part of the user's body (such as the cartilage of the outer ear) and air-conducted sound to the user. Therefore, when sound is output at a volume equivalent to a conventional dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

Furthermore, the electronic device 1 transmits vibration sound by body vibration of the panel 10, and therefore even if the user is wearing earphones or headphones, the user can hear sound through the earphones or headphones and through a part of the body by touching the electronic device 1 against the earphones or headphones.

The above electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by air but not liquid. Gore-Tex (registered trademark) is an example of a member permeable by air but not liquid.

Third Embodiment

FIGS. 18A-18D illustrate the housing structure of the electronic device 1 according to a third embodiment. FIG. 18A is a front view, and FIG. 18B is a sectional view taken along a line b-b of FIG. 18A. FIG. 18C is a sectional view taken along a line c-c of FIG. 18A. FIG. 18D is a variation of FIG. 18C. The electronic device 1 illustrated in FIGS. 4A and 4B is a smartphone in which the touch panel, i.e., a glass plate, is disposed on a front surface of a housing 60 (e.g. a metal or a resin casing). The panel 10 and the input unit 40 are supported on the display 20 by the housing 60, and the display 40 and the piezoelectric element 30 are each adhered to the panel 10 by a joining member 1870. Note that the joining member 1870 may be the adhesive agent, the double-sided adhesive tape, or the like having thermosetting properties, ultraviolet-curable properties, or the like. For example, the joining member 70 may be an optical elastic resin, which is a colorless and transparent ultraviolet-curable acrylic adhesive agent. The panel 10, the display 20, and the piezoelectric element 30 each have a substantially rectangular shape.

The display 20 is disposed in substantially a middle of the panel 10 in a short-side direction thereof. The piezoelectric element 30 is disposed near an (upper) end of the panel 10 in the longitudinal direction of the panel 10 at a predetermined distance from the end such that the longitudinal direction of the piezoelectric element 30 extends along a short side of the panel 10. The display 20 and the piezoelectric element 30 are disposed side by side in a direction parallel to a surface of an inner side of the panel 10.

The input unit 40 is supported by the housing 60 at the other end (lower part) in the longitudinal direction of the panel 10. A mouthpiece 41 of a microphone is formed in the input unit 40, as indicated by the dashed line. In other words, the piezoelectric element 30 is disposed at the upper end of the rectangular housing 60, and the mouthpiece 41 is formed at the lower end.

When hearing a sound by device 1 the electronic, the user has, for example, his/her ear in contact with the panel 10. Hereinafter, an area of the panel 10 assumed to be contacted with a part of human body (for example, an ear) is referred to as an contact area. In the panel 10, at least the contact area needs to be vibrated. The contact area may overlap in a part with an area where the piezoelectric element 30 is attached. The contact area may include the entirety of the attach area.

In the housing 60, a rib 61 is provided along the short-side thereof, projecting toward the panel 10. In other words, the rib 61 is provided extending along the short-side of the housing 60. The rib 61 is provided so as to divide space in which the display 20 is located and space in which the piezoelectric element 30 is located within the housing 60. As indicated by a broken line/hatching in FIG. 18A, the panel 10 is joined to the housing 60 by the joining member 1870 at the outer peripheral portion. And, the panel 10 is not joined with all of the rib 61. For example, the panel 10 is joined to the rib 61 by the joining member 1870, at the both ends along the short side of the panel among areas facing the rib 61. The panel 10 is not joined to the rib 61 at an area, along on the side of a long side of an attach area where the piezoelectric element 30 is attached and on the side of the display 20, among areas facing the rib 61.

As illustrated in FIG. 18C, the rib 61 is provided extending in along the short side of the housing 60. The rib 61 serves as a beam. Therefore, the rigidity or strength of the housing increases, and chattering sound due to the deformation of the piezoelectric element 30 is suppressed.

As illustrated in FIG. 18D, the rib 61 may not be provided in a portion which is not joined with the panel 10 by the joining member 1870. The rib 61 may be provided with, as illustrated in FIG. 18D, a cutout portion 63 in vicinity of central part of the short side of the housing 60. According to the configuration illustrated in FIG. 18D, space in which the display 20 is located and space in which the piezoelectric element 30 is located within the housing 60 are connected with each other by the cutout portion 63. Thus, for example, heat generated by the display 20 operating is more likely to be guided into the space of the piezoelectric element 30, and thus the possibility of a malfunction of the display 20 due to the heat is reduced.

The cutout portion 63 illustrated in FIG. 18D is merely a space formed by cutting out, provided with no other member s. The cutout portion 63 illustrated in FIG. 18D may be provided with, for example, sponges as dustproof. The sponge, from the viewpoint of the dustproof, preferably has thickness corresponding to the distance between the panel 10 and the bottom surface of the housing 60 so as to come in contact with the panel 10, but not in tight contact for the sake of the panel 10 suitably vibrating. The shape, the thickness, material or the like of the sponge are appropriately selected in consideration of the vibration of the panel and dustproof properties described above.

Figure 19:
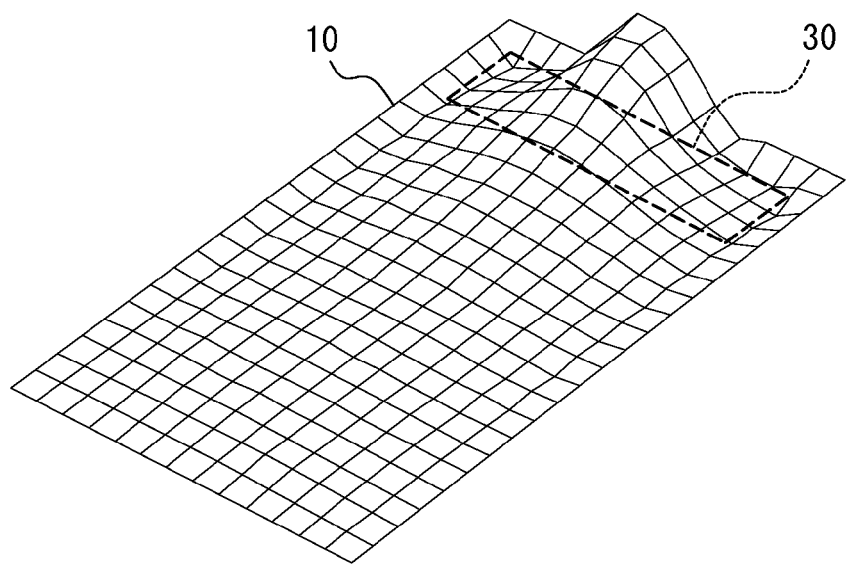
FIG. 19 illustrates an example of vibration of a panel of the electronic device according to the third embodiment.

FIG. 19 illustrates one example of the vibration of the panel 10 of the electronic device 1 according to the third embodiment. In the electronic device according to the third embodiment, the display 20 is attached to the panel 10. In the panel 10, the upper part is bent directly by the piezoelectric element 30, and the vibration is attenuated in the lower part compared to the upper part. The panel 10 is bent by the piezoelectric element 30, such that a part immediately above the piezoelectric element 30 is raised higher than its surrounding parts in the longitudinal direction of the piezoelectric element 30. Thereby, the rigidity of the lower part of the panel 10 is increased, and the upper part of the panel 10, where the piezoelectric element 30 is attached, may vibrate in greater magnitude than the lower part of the panel 10. Further, the panel 10 is not joined to the rib 61 at the center of its extending direction, and therefore the vibration is sufficiently propagated from the central part to vicinity of the central part of the panel 10. Also, the vibration of the panel 10 is attenuated at the lower part of the panel 10.

According to the electronic device 1 of the present embodiment, the piezoelectric element 30 is disposed on the back of the panel 10 inside of the housing 60 and thus is not exposed to the outside. Thereby the portability may be improved. In addition, the panel 10 is sufficiently vibrated from one end in the longitudinal direction, at which the piezoelectric element 30 is attached, to the vicinity of the central part of the other end. Therefore, the user is able to listen to air conduction sound and vibration sound caused by vibration of the panel 10 by having a part of the body (cartilage of the ear, for example) of the user contact at least a part of the upper part from the central part of the panel 10. Thereby, the user may use the electronic device 1 in an arbitrary posture, and usability is improved. Further, with the panel 10, the vibration of the lower part is reduced, and thus sound leakage is suppressed. Incidentally, the vibrational distribution of the panel 10 by the piezoelectric element 30 may be adjusted by means of an joining area or position of the rib 61 on the panel 10. Therefore, the configuration in which the panel 10 is not joined at all to the rib 61 is also possible.

According to the present embodiment, the joining member 1870 is not provided in an area where the display 20 is located in the longitudinal direction from the attach area where the piezoelectric element 30 is attached, among the area facing the rib 61. Therefore, the vibration of the piezoelectric element 30 attached near one end of the longitudinal direction of the panel 10 is not attenuated when transmitted towards the other end in the longitudinal direction of the panel 10. This may mean that, for example, if the contact area does not include the attach area, that is, the user's ear is not in contact with the attach area, the joining member 1870 is not disposed between the attach area and the contact area. In other words, the joining member 1870 is disposed in an area except for an area between the attach area and the contact area. Or, the joining member 1870 is disposed such that vibration of the panel 10 is not attenuated between the contact area and the attach area. Also, for example, in the case that the attach area and the contact area partially overlap, or the attach area is included in the contact area, that is, when the user's ear comes into contact with the attach area, the joining member 1870 is not disposed in the contact area. In other words, the joining member 1870 is disposed in an area other than the contact area.

Fourth Embodiment

Figure 20A:
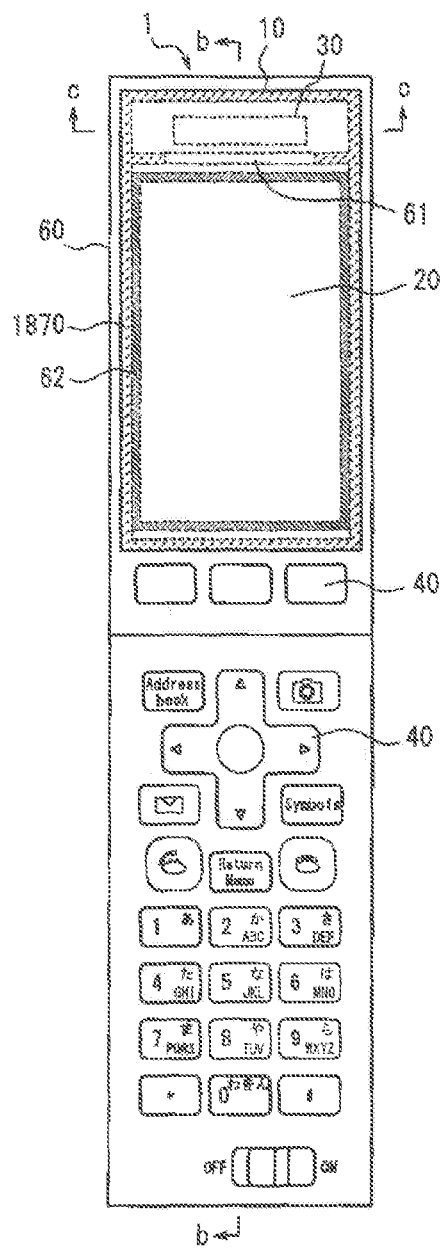
FIGS. 20A-20C illustrate a housing structure of the electronic device according to a fourth embodiment.
Figure 20B:
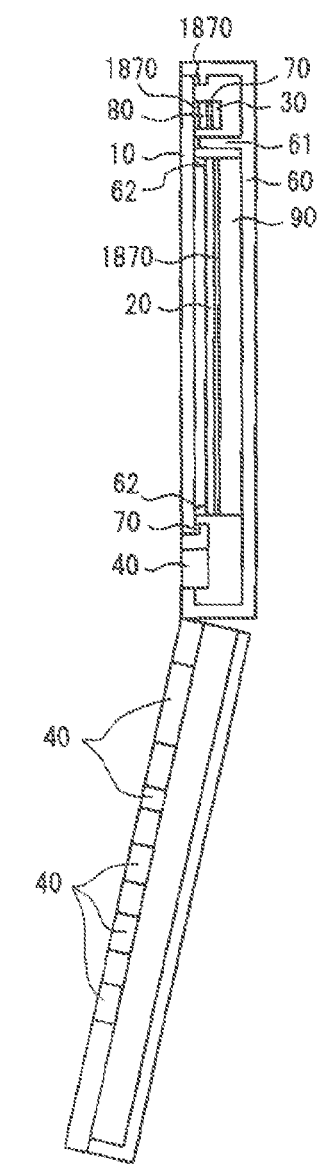
Figure 20C:
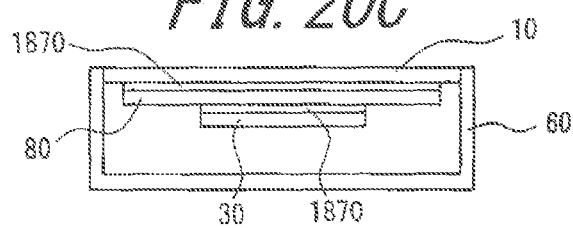

FIG. 20 schematically illustrates parts of a housing structure of the electronic device 1 according to a fourth embodiment. FIG. 20(a) is a front view, FIG. 20(b) is a cross-sectional view along the b-b line of FIG. 20(a), and FIG. 20(c) is a cross-sectional view along the c-c line of FIG. 20(a). The electronic device 1 illustrated in FIG. 20 is a clamshell mobile phone in which a cover panel (an acrylic plate) protecting the display 20 is disposed on the front face of an upper housing 60 as the panel 10. In the fourth embodiment, a reinforcing member 80 is disposed between the panel 10 and the piezoelectric element 30. The reinforcing member 80 is, for example, a resin plate, sheet metal, or a plate including glass fibers. In other words, in the electronic device 1 according to the fourth embodiment, the piezoelectric element 30 and the reinforcing member 80 are adhered by the joining member 1870, and furthermore the reinforcing member 80 and the panel 10 are adhered by the joining member 1870. Furthermore, in the fourth embodiment, the display 20 is not adhered to the panel 10, but rather is supported by the housing 60. Specifically, in the electronic device 1 according to the fourth embodiment, the display 20 is separated from the panel 10 and adhered by the joining member 1870 to a support 90, which is a portion of the housing 60. Note that the support 90 is not restricted to being a portion of the housing 60 and may be a member formed from metal, resin or the like and independent from the housing 60.

In the electronic device 1 according to the fourth embodiment, as with the third embodiment, the panel 10 is not joined to the entirety of the rib 61. To be more concrete, the panel 10 is connected to the rib 61, at both ends along the short side of the panel, among the areas facing the rib 61, by the joining member 1870. The panel 10 is not joined to the rib 61 at an area on the side of the display in the longitudinal direction from the attach area where the piezoelectric element 30 is attached, among areas facing the rib 61.

Figure 21:
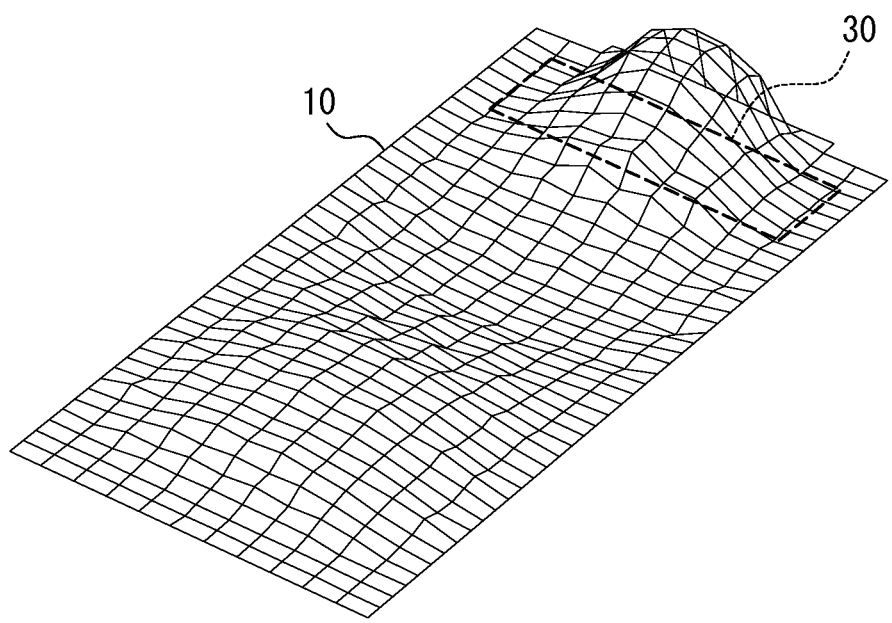
FIG. 21 illustrates an example of vibration of a panel of the electronic device according to the fourth embodiment.

FIG. 21 illustrates one example of the vibration of the panel 10 of the electronic device 1 according to the fourth embodiment. In the panel 10, the upper part is bent directly by the piezoelectric element 30, and the vibration is attenuated in the lower part compared to the upper part. The panel 10 is bent by the piezoelectric element 30, such that a part immediately above the piezoelectric element 30 is raised higher than its surrounding parts in the longitudinal direction of the piezoelectric element 30. Since in the electronic device 1 according to the fourth embodiment the panel 10 is the acryl plate with lower rigidity compared to the glass plate, and moreover, the display 20 is not adhered to the back surface of the panel 10, amplitude generated by the piezoelectric element 30 is larger than the case of the electronic device 1 according to the first embodiment as illustrated in FIG. 19. Further, the panel 10 is not joined to the rib 61 at the center of its extending direction, and therefore the vibration is sufficiently propagated from the central part to vicinity of the central part of the panel 10. Also, the vibration of the panel 10 is attenuated at the lower part of the panel 10.

Accordingly, with the electronic device 1 according to this embodiment, a similar advantageous effect to the third embodiment is obtained. For a detailed example, since the vibration is sufficiently transmitted to the lower part of the panel 10, the user is able to hear air-conduction sound transmitted through air and to hear human body vibration sound by placing the ear in contact with any position of the panel 10.

Figure 22:
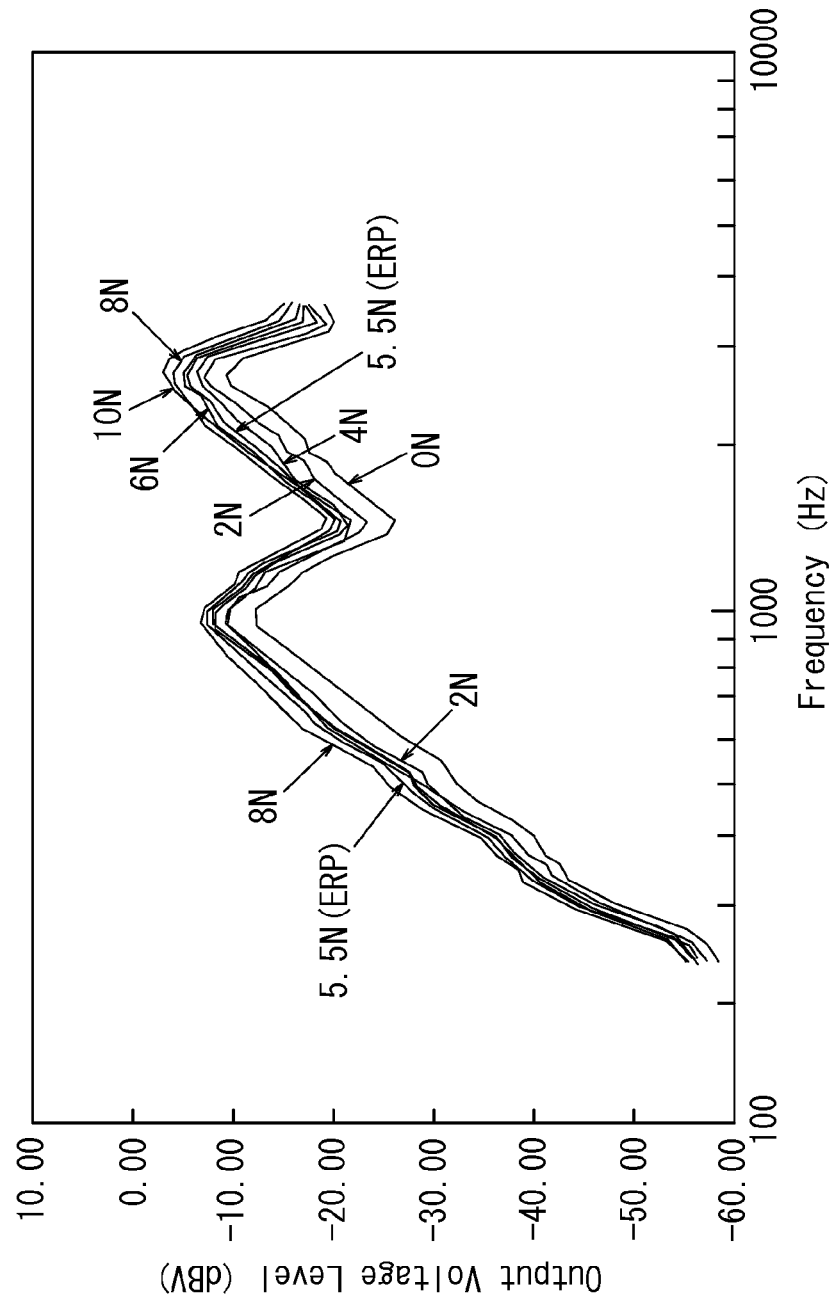
FIG. 22 illustrates a frequency characteristic of a panel of the electronic device according to the fourth embodiment.
Figure 23:
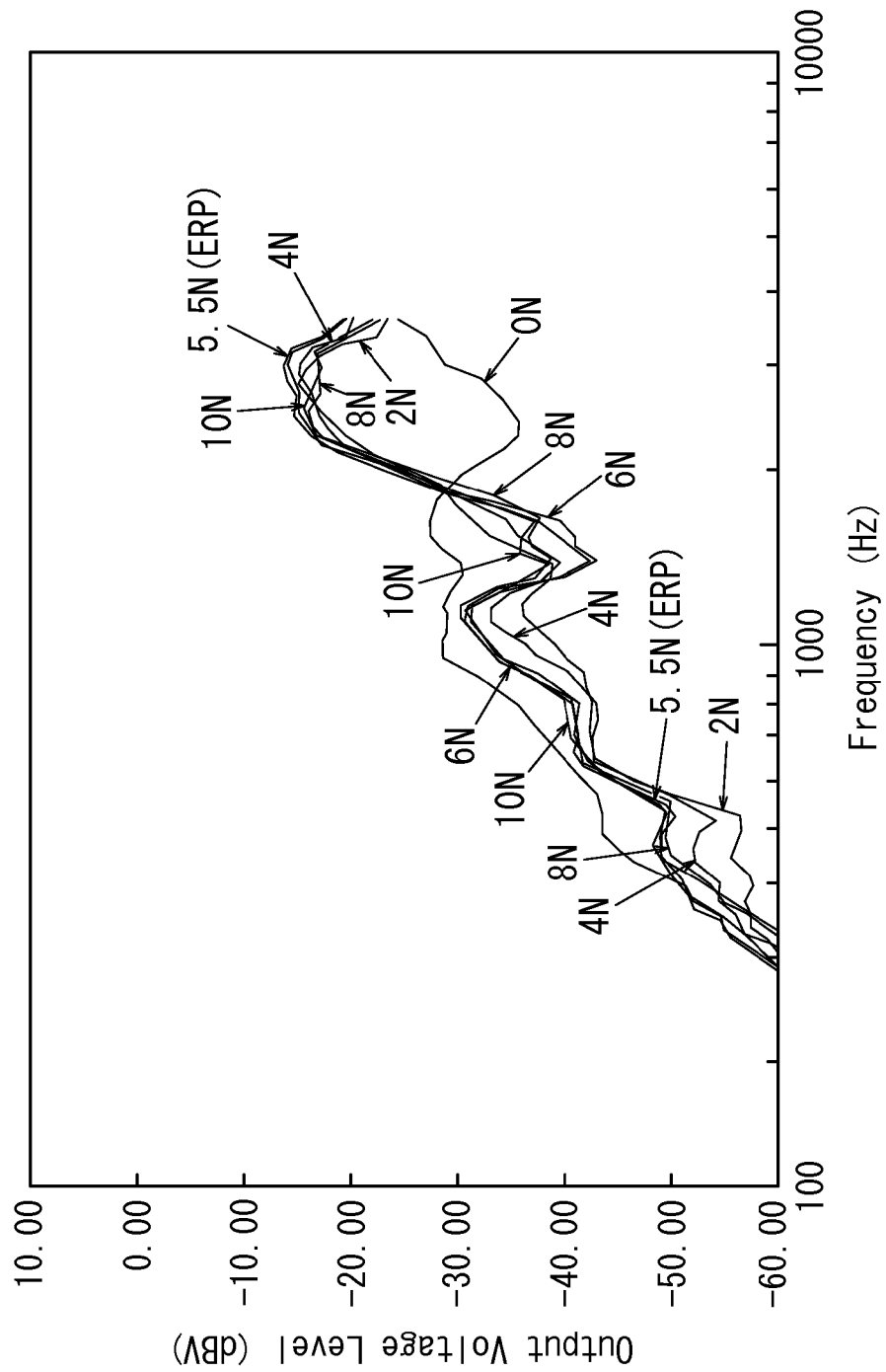
FIG. 23 illustrates a frequency characteristic of a panel as an comparative example to FIG. 7.
Figure 24:
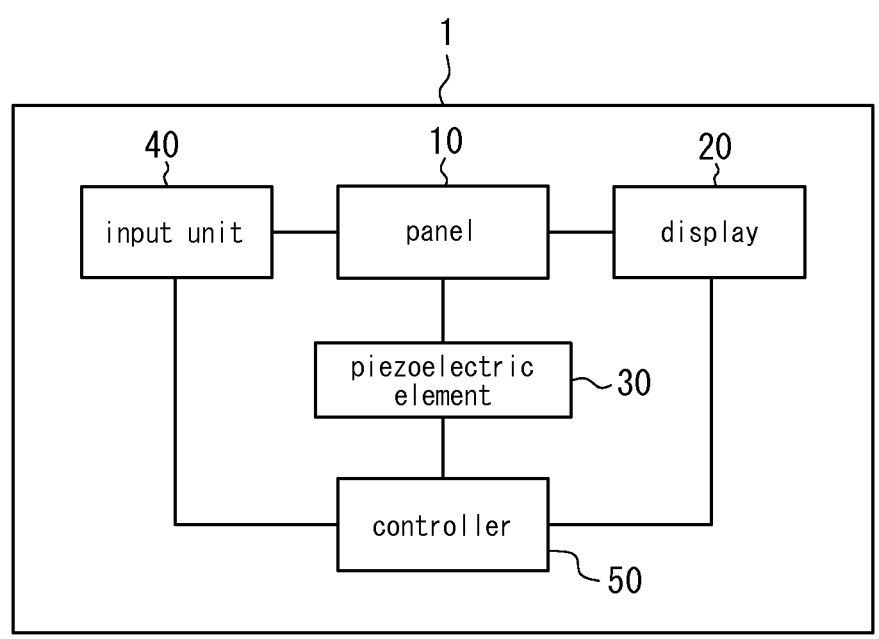
FIG. 24 is a function block diagram of an electronic device according to yet another embodiment of the present invention.

Operation and effect of this embodiment will be described with reference to FIGS. 22 and 23. FIGS. 22 and 23 are frequency characteristic diagrams illustrating the relation between the output voltage level and frequency of the audio signal. The output voltage level is output voltage of acoustic measurement instrument (HATS). FIGS. 22 and 23 are frequency characteristic diagrams in the case of changing force applied to the electronic device 1 to press it against the ear part of HATS. FIG. 22 is a frequency characteristic diagram of the electronic device 1 in this embodiment, such that, out of the portions of the panel 10 which overlaps the rib 61, the portion excluding a portion facing the piezoelectric element 30 in the longitudinal direction is joined to the rib 61 by the joining member 1870. FIG. 23 is a frequency characteristic diagram in the case that the entire portion of the panel 10 which overlaps the rib 61 is joined to the rib 61 by the joining member 1870.

In comparison of FIGS. 22 and 23, In FIG. 22 the output voltage level is increased at all frequencies compared to FIG. 23. For example, the output voltage level at 1000 Hz in the case of pushing in 5.5N is about −33 dBV in FIG. 23 and about −9 dBV in FIG. 22.

Also, in comparison of FIGS. 22 and 23, In FIG. 22 the variation of the frequency characteristic curve of the case of changing the pressing force is small compared to FIG. 23. As a result of computation of the standard deviation of the output voltage level in the case of changing the pressing force at a certain frequency, in FIG. 23, the standard deviation is about 4 dBV at 400-500 Hz band, about 4 dBV at 1000-2000 Hz band, and about 7 dBV at 2000 Hz or more. In contrast, in FIG. 22, the standard deviation is about 2 dBV at 400-500 Hz band, about 2 dBV at 1000-2000 Hz band, and about 3 dBV at 2000 Hz or more, which describes the variation of the frequency characteristic curve of the case of changing the pressing force remains small.

Disposing the reinforcing member 80 between the piezoelectric element 30 and the panel 10 can reduce the probability of an undesired external force being transmitted to and damaging the piezoelectric element 30 if, for example, such a force is applied to the panel 10. Moreover, even if the panel 10 is pressed firmly against the user's body, vibrations of the panel 10 do not dampen easily. By disposing the reinforcing member 80 between the piezoelectric element 30 and the panel 10, the resonance frequency of the panel 10 also decreases, thereby improving the acoustic characteristic in the low frequency band. Note that instead of the reinforcing member 80, a plate-shaped anchor may be attached to the piezoelectric element 30 by the joining member 1870.

Although the present invention has been described by way of embodiments with reference to the accompanying drawings, it is to be noted that various changes and modifications will be apparent to those skilled in the art. Therefore, such changes and modifications are to be understood as included within the scope of the present invention. For example, the functions and the like included in the various member s and steps may be reordered in any logically consistent way. Furthermore, components or steps may be combined into one or divided.

For example, the piezoelectric element 30 may be equipped with a plurality. Further, the rib 61 may be configured to be, not limited to being formed to be long, for example, be arranged intermittently with protruding member.

The electronic device 1 according to the third and fourth embodiments has a structure such that an area of the panel 10 overlapping the display 20 is the contact area to be in contact with the user's ear, and an area between the attach area where the piezoelectric element 30 is attached and the contact area is not joined to the housing. However, the present invention is not limited to the above structure. For example, depending on the user's manner for having the panel 10 in contact with the ear, the attach area may be included within the contact area, or the attach area and the contact area overlap in a part. Such a case is applicable, as long as the contact area of the panel is not joined by the joining member to the housing 60. That is, it is sufficient that the panel 10 is joined to the housing 60 by the joining member 1870, such that transmission of vibration caused by deformation of the piezoelectric element 30 is not attenuated (inhibited) in between the attach area and the contact area.

The panel 10 may be joined to the rib 61 by the joining member 71 which is more deformable than the joining member 1870 in an area positioned on the side of the display 20 in the longitudinal direction from the attach area where the piezoelectric element 30 is attached, among areas facing the rib 61. As the combination of the joining member 1870 and the joining member 71 more deformable than the joining member 1870, the following combinations may be listed.

If the joining member 1870 is a joining member, for example, made of non-thermosetting adhesive agent, the joining member 12 may be, for example, a foam filled double-sided tape. For example, foam filled double-sided tape is a double-sided tape with acrylic adhesive layered on both surfaces of the base material of polyethylene having a fine independent closed-cell structure. The foam filled double-sided tape may be a double-sided tape with acrylic adhesive layered on both sides of polyester substrate or a PET substrate. The joining member 1870 may be, for example, a moisture-curing elastic adhesive that hardens by reacting with moisture (humidity) in the air, such as mainly including special polymers containing silyl groups.

The joining member 71 and the joining member 1870 are not limited to those described above. The joining member 1870 may be of a kind more easily deformed than the joining member 71. For example, the ease of deformation is measured, for example, by penetrometer or spring type hardness tester compliant with JIS standard. The joining member 1870 may be of higher adhesivity than the joining member 71. For example, the adhesivity as referred to herein is measured by the method defined in (including both new and old) JISZ0237. The joining member 1870 may have higher adhesivity than the joining member 71. For example, the adhesivity herein is the strength of tensile adhesion as measured by the method specified in JISK6849.

Other embodiments of the present invention will be described with reference to the accompanying drawings. FIG. 1 is a function block diagram of an electronic device 1 according to one embodiment of the present invention. The electronic device 1, which is a mobile phone (smartphone), for example, includes a vibration plate 100, a display 20, a piezoelectric element 30, an input unit 40, and a controller 50. If the electronic device 1 of the embodiments functions as the mobile phone, the acoustic device 100 generates sound which is transmitted to an inner part of a human body by a vibration of the panel 10 generated by the piezoelectric element 30. The sound to be transmitted to an inner part of the human body passes through a soft tissue of the human body (e.g. a cartilage) to vibrate a middle ear or an inner ear.

The panel 10 is a touch panel that detects a touch or is a cover panel or the like that protects the display 20. The panel 10 is, for example, made from glass or a synthetic resin such as acrylic or the like. The panel 10 may be plate-like in shape, or a curved panel having smoothly curved surface. When the panel 10 is a touch panel, the panel 10 detects a touch by the user's finger, a pen, a stylus pen or the like. Any detection system may be used in the touch panel, such as a capacitive system, a resistive film system, a surface acoustic wave system (or an ultrasonic wave system), an infrared system, an electromagnetic induction system, a load detection system or the like.

The display 20 is a display device such as a liquid crystal display, an organic EL display, an inorganic EL display or the like. The display 20 is provided at the back side of the panel 10. The display 20 is disposed on the back face of the panel 10. The display 20 may be disposed at a distance from the panel 10 and supported by the housing of the electronic device 1. Or, in a preferable embodiment, the display 20 may be joined to the back side of the panel 10 by the joining member (for example, adhesive agent). The joining member may be an elastic resin such as an optical elastic resin with the refractive index of the light to be transmitted being controlled. The display 20 displays various information through the joining member and the panel 10. By joining the display 20 to the back side of the panel 10, as described later, attenuation of the vibration of the panel 10 may be adjusted.

The piezoelectric element 30 is formed by elements that, upon application of an electric signal (voltage), either expand and contract or flex in accordance with the electromechanical coupling coefficient of their constituent material. Ceramic or crystal elements, for example, are used. The piezoelectric element 30 may be a unimorph, bimorph or laminated piezoelectric element. A laminated piezoelectric element includes a laminated unimorph element with layers of unimorph (for example, 16 or 24 layers) and a laminated bimorph element with layers of bimorph (for example, 16 or 24 layers). Such a laminated piezoelectric element is constituted by a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph flexes upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of the housing 60 by a predetermined distance. The piezoelectric element 30 is preferably separated from the inner surface of the housing by the predetermined distance even when expanding and contracting or flexing. In other words, the distance between the piezoelectric element 30 and the inner surface of the housing 60 is preferably larger than the maximum amount of deformation of the piezoelectric element 30.

The input unit 40 accepts operation input from the user and is constituted, for example, by operation buttons (operation keys). Note that when the panel 10 is a touch panel, the panel 10 can also accept operation input from the user by detecting a touch by the user.

The controller 50 is a processor that controls the electronic device 1. The controller 50 applies a predetermined electric signal (a voltage corresponding to an audio signal) to the piezoelectric element 30. The maximum voltage of the electric signal that the controller 50 applies to the piezoelectric element 30 may, for example, be ±15 V. This is higher than ±5 V, i.e. the applied voltage of the so-called panel speaker for conduction of air-conducted sound, not vibration sound. In this way, even if the user presses the panel 10 against the user's with, for example, a force of 3 N or greater (e.g., 5 N to 10 N), sufficient vibration is generated in the panel 10, so that a vibration sound can be generated via a part of the user's body. Note that the magnitude of the applied voltage used may be appropriately adjusted for the fixation strength of the panel, the performance of the element and other such factors.

When the controller 50 applies an electric signal to the piezoelectric element 30, the piezoelectric element 30 undergoes expansion and contraction or flexure in a longitudinal direction. At this point, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member 80 which is later described. Thus, the panel 10 generates air conduction sound, and the panel 10 also generates vibration sound that is transmitted through a part of the body when the user places the part of the body (e.g. the cartilaginous portion of the external ear) in contact with the panel 10. The controller 50 may apply an electric signal corresponding to a sound signal representing voice of the party on the phone or the like, so as to generate air conduction sound and vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like via the network.

The vibration is caused in an area of the panel 10 where the piezoelectric element 30 is disposed and in other areas of the panel 10 that are away from the area where the piezoelectric element 30 is disposed. The panel 10 includes, in the areas vibrated, a plurality of portions that are configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed or at certain intervals across the panel 10 at a certain moment. In other words, the vibration of a plurality of wavelengths is detected across substantially all areas of the panel 10. In order to prevent the aforementioned vibration of the panel 10 from being attenuated even when the user forcefully presses the panel 10 against the user's body with force ranging from 5 N to 10 N, for example, the voltage that the controller 50 applies to the piezoelectric element 30 may be ±15 V. The above configuration allows the user to listen to sound while placing the ear in contact with the areas of the panel 10 that are away from the area where the piezoelectric element 30 is disposed.

Figure 25:
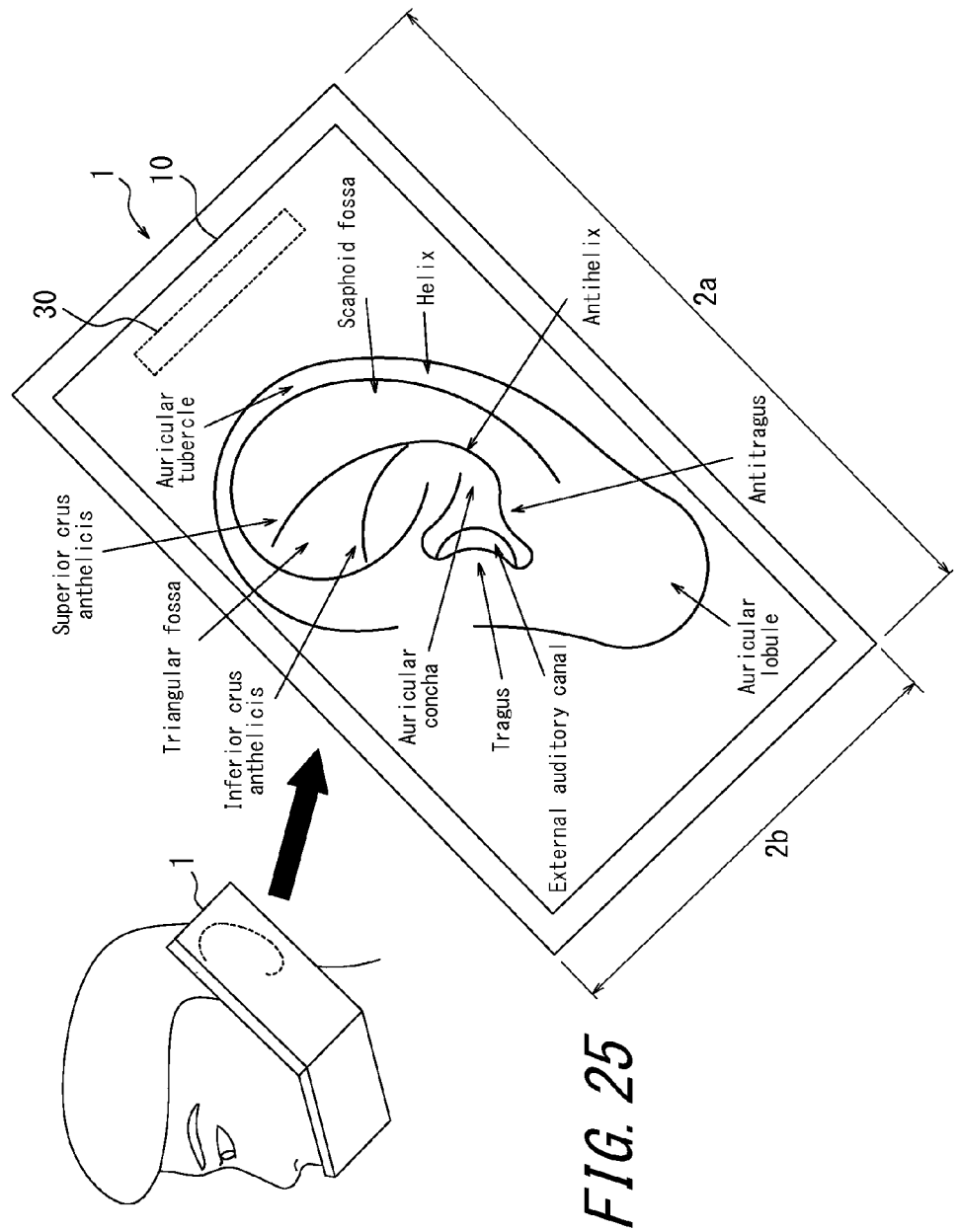
FIG. 25 illustrates a preferable shape of a panel.

It is to be noted that the panel 10 may be as large as the user's ear. As illustrated in FIG. 25, the panel 10 may also be larger than the user's ear. In this case, when the user listens to sound, the whole ear tends to be covered by the panel 10 of the electronic device 1. As a result, ambient sound (noise) is prevented from entering through the external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. A length direction herein refers to a longitudinal direction 2a along which the panel 10 extends, and the piezoelectric element 30 is disposed closer to one end relative to a middle of the panel 10 in the longitudinal direction 2a. A width direction refers to a direction 2b intersecting with the longitudinal direction. The areas having the above lengths and widths may have a rectangular shape or an elliptical shape with as a major axis corresponding to the length and a minor axis corresponding to the width. Average ear size of the Japanese can be seen from the Japanese Body Dimension Database (1992-1994) or the like distributed by the Research Institute of Human Engineering for Quality Life (HQL). The panel 10 with a size greater than or equal to the average ear size of the Japanese would be generally capable of covering a whole ear of a foreigner as well.

With the aforementioned dimension and shape, the panel 10 is capable of covering the user's ear, which offers tolerance to misalignment when the user presses the panel 10 to the ear.

By vibration of the panel 10, the electronic device 1 can transmit vibration sound through a part of the user's body (such as the cartilage of the outer ear) and air-conducted sound to the user. Therefore, when sound is output at a volume equivalent to a conventional dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

Furthermore, the electronic device 1 transmits vibration sound by vibration of the panel 10, and therefore even if the user is wearing earphones or headphones, the user can hear sound through the earphones or headphones and through a part of the body by touching the electronic device 1 against the earphones or headphones.

The above electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by air but not liquid. Gore-Tex (registered trademark) is an example of a member permeable by air but not liquid.

Fifth Embodiment

FIGS. 26A and 26B illustrate the housing structure of the electronic device 1 according to a fifth embodiment. FIG. 26A is a front view, and FIG. 26B is a sectional view taken along a line b-b of FIG. 26A. The electronic device 1 illustrated in FIGS. 26A and 26B is a smartphone in which the touch panel, i.e., a glass plate, is disposed on a front surface of a housing 60 (e.g. a metal or a resin casing). The panel 10 is, as described later, joined to the housing 60 by the joining member, and is supported by the housing 60. The joining member may be adhesive agent or double-sided adhesive tape. The input unit 40 is supported by the housing 60, and the display 20 and the piezoelectric element 30 are each adhered to the panel 10 by a joining member 2670. Note that the joining member 2670 may be the adhesive agent, the double-sided adhesive tape, or the like having thermosetting properties, ultraviolet-curable properties, and the like. For example, the joining member 2670 may be an optical elastic resin, which is a colorless and transparent ultraviolet-curable acrylic adhesive agent. The panel 10, the display 20, and the piezoelectric element 30 each have a substantially rectangular shape.

The display 20 is disposed in substantially a middle of the panel 10 in a short-side direction thereof. The piezoelectric element 30 is disposed near an end of the panel 10 in the longitudinal direction of the panel 10 at a predetermined distance from the end such that the longitudinal direction of the piezoelectric element 30 extends along a short side of the panel 10. The display 20 and the piezoelectric element 30 are disposed side by side in a direction parallel to a surface of an inner side of the panel 10.

Figure 27:
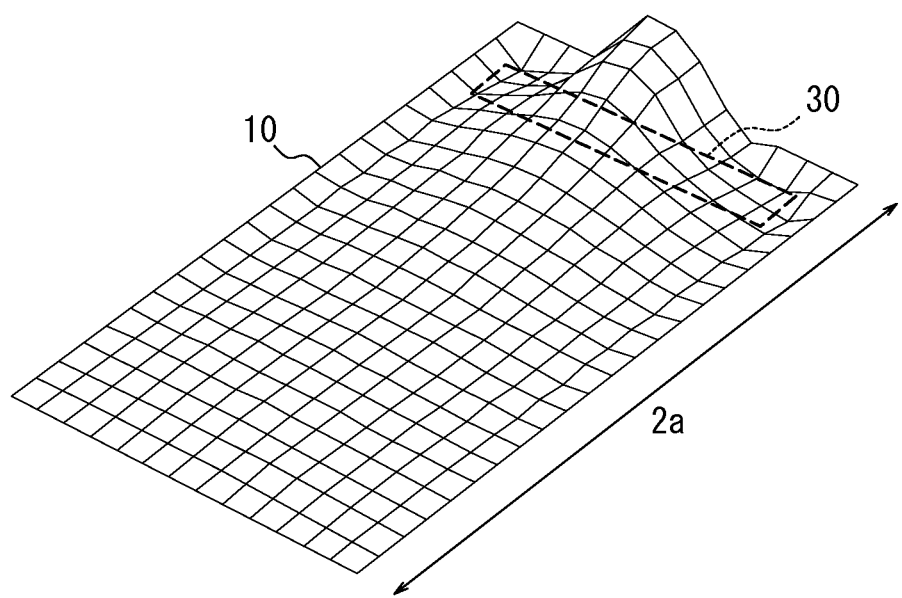
FIG. 27 illustrates an example of vibration of a panel of the electronic device according to one embodiment.

FIG. 27 illustrates one example of the vibration of the panel 10 of the electronic device 1 according to the fifth embodiment. In the panel 10, the upper part is bent directly by the piezoelectric element 30, and the vibration is attenuated in the lower part compared to the upper part. The panel 10 is bent by the piezoelectric element 30, such that a part immediately above the piezoelectric element 30 is raised higher than its surrounding parts in the longitudinal direction of the piezoelectric element 30. In the electronic device 1 according to the fifth embodiment the display 20 is attached to the panel 10. Thereby, the lower part of the panel 10 is less likely to vibrate compared to the upper part of the panel 10, where the piezoelectric element 30 is attached. That is, the vibration of the panel 10 caused by the piezoelectric element 30 is attenuated at the lower part of the panel 10. Accordingly, with the panel 10, sound leakage caused by vibration of the lower part of the panel 10 may be suppressed.

As described above, according to the electronic device 1 of the present embodiment, the panel 10 is deformed due to deformation of the piezoelectric element 30 attached to the back surface of the panel 10, and air conduction sound and vibration sound are transmitted to an object that is in contact with the deformed panel 10. As a result, air conduction sound and vibration sound are transmitted to the user without having to protrude the vibration body from an outer surface of the housing 60. Accordingly, usability of the electronic device is improved compared to such an electronic device as described in Patent Literature 1 (Japanese Patent Application Publication No. 2005-348193), by which the user places the vibration body, which is significantly small compared to the housing, in contact with the body. Furthermore, since there is no need for pressing the user's ear to the piezoelectric element itself, the piezoelectric element 30 itself is less likely to be damaged. Moreover, although in a case where not the panel 10 but the housing 60 is deformed the user tends to drop a terminal device while the vibration is generated, such dropping is less likely to occur in the case where the panel 10 is vibrated.

The piezoelectric element 30 is joined to the panel 10 by the joining member 2670. The above structure allows attachment of the piezoelectric element 30 to the panel 10 in a manner such that flexibility of deformation of the piezoelectric element 30 is less likely to be limited. The joining member 2670 may be a non-thermosetting adhesive agent. The above structure provides an advantage that contraction due to a thermal stress is less likely to occur during curing between the piezoelectric element 30 and the panel 10. The joining member 2670 may be the double-sided adhesive tape. The above structure provides an advantage that a contraction stress, which often occurs when the adhesive agent is used, is less likely to be applied between the piezoelectric element 30 and the panel 10.

Figure 28:
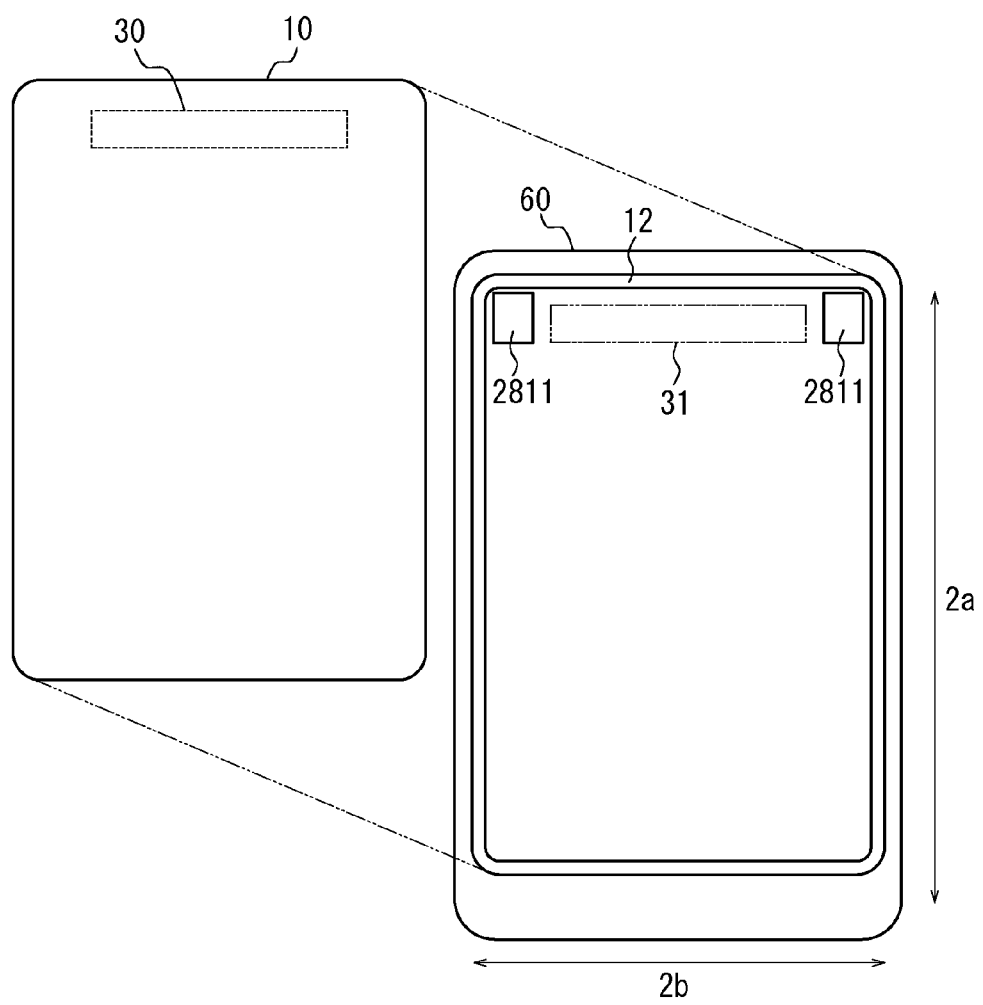
FIG. 28 schematically illustrates joining of the panel and the housing.

Here, with reference to FIG. 28, a joining structure of the housing 60 and the panel 10 will be described. FIG. 28 is a diagram illustrating a schematic embodiment of joining of the housing 60 and the panel 10. In FIG. 28, a state in which the panel 10 is separated from the housing 60 is illustrated. In FIG. 28, numeric symbol 31 indicates a position of the piezoelectric element 30 in a state where the panel 10 and the housing 60 are attached. As illustrated on the side of the housing 60, the housing 60 and the panel 10 are joined by the joining member s 2811, 12. The joining member s 2811 are joining member s, for example, made of non-thermosetting adhesive agent. The joining member 2811 may be, for example, a double-sided tape with acrylic adhesive layered on both sides of polyester substrate or a PET substrate. The joining member s 2811 may be, for example, a moisture-curing elastic adhesive that hardens by reacting with moisture (humidity) in the air, such as mainly including special polymers containing silyl groups. The joining member s 2811 may be, for example, a foam filled double-sided tape. For example, foam filled double-sided tape is a double-sided tape with acrylic adhesive layered on both surfaces of the base material of polyethylene having a fine independent closed-cell structure The joining member s 2811 and the joining member 12 are not limited to those described above. The joining member s 2811 may be of a kind more easily deformed than the joining member 12. For example, the ease of deformation is measured, for example, by penetrometer or spring type hardness tester compliant with JIS standard. The joining member s 2811 may be of higher adhesivity than the joining member 12. For example, the adhesivity as referred to herein is measured by the method defined in (including both new and old) JISZ0237. The joining member s 2811 may have higher adhesivity than the joining member 12. For example, the adhesivity herein is the strength of tensile adhesion as measured by the method specified in JISK6849.

The joining member s 2811 are disposed in the vicinity of the piezoelectric element 30, to be in detail, the left and right sides of the piezoelectric element 30, that is, on the sides along the longitudinal direction and expansion/contraction direction 2b of the piezoelectric element 30 (the direction along the short side of the panel 10). However, the case that the joining member 2811 is disposed on either of the left and right of the piezoelectric element 30 is also included in the present embodiment. On the other hand, the joining member 12 is disposed at the edge of the panel 10 along the periphery of the panel 10. The positional relation with respect to the piezoelectric element 30, the joining member 12 is disposed on the side of the upper end of the panel 10 and on the side of the sort-side of the piezoelectric element 30, that is, on the sides along a direction different from the expansion/contraction direction 2a of the piezoelectric element 30 (the longitudinal direction of the panel 10). Then, in the direction 2b of the short-side of the piezoelectric element 30, the joining member 2811 is disposed between the joining member 12 and the piezoelectric element 30. By thus disposed joining member s 2811 and 12, the panel 10 is securely attached to the housing 60. Further, the joining member s 2811 and 12 have waterproof property, and inhibits water entering from the gap between the housing 60 and the panel 10.

Figure 29:
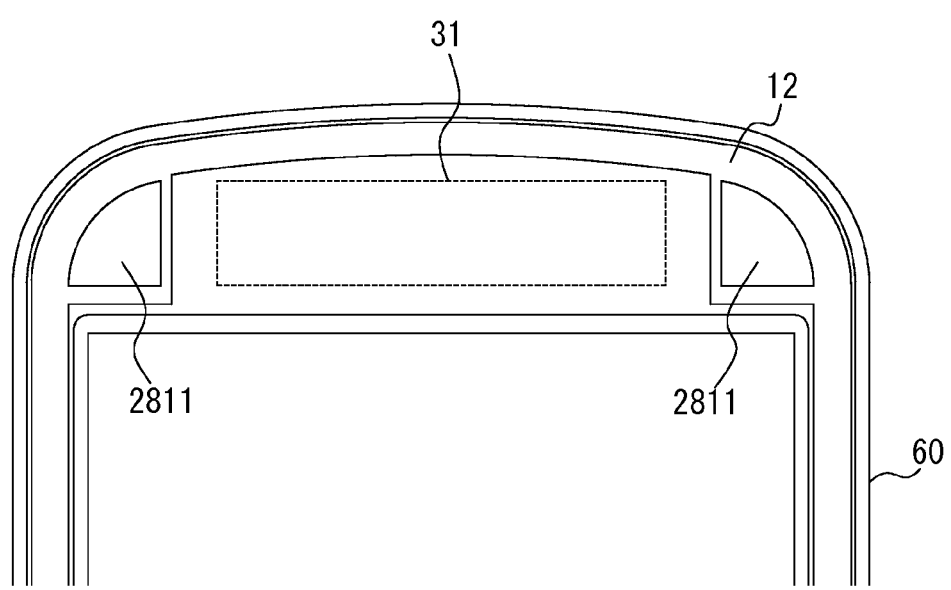
FIG. 29 is a magnified view of the housing illustrating joining of the panel and the housing.

In a preferable embodiment, as illustrated in the enlarged view of FIG. 29, the joining member 12 and 2811 are joined to each other, such that, for example, the joining member 12 surrounds the outer periphery of the joining member 2811. Thereby, adhesion of the housing 60 and the panel 10 is strengthen.

In the fifth embodiment, the panel 10 is attached to the housing 60 by the above described joining member s 2811 and 12, and thereby the frequency characteristic of the panel 10 is improved comparing to the case, as illustrated in FIG. 30 for example, that the panel 10 is attached only by the joining member 12, that is, only by a double-sided tape.

Figure 31A:
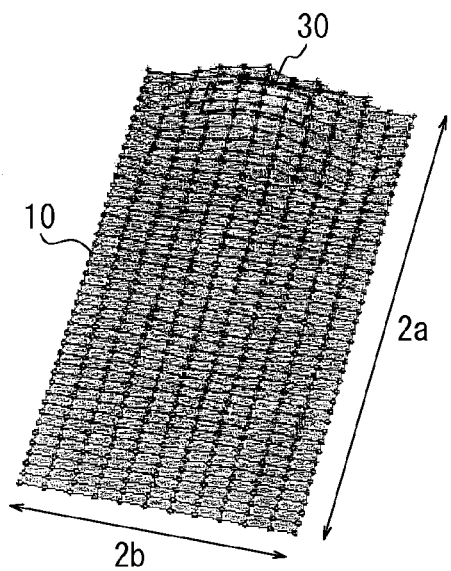
FIGS. 31A-31D illustrate examples of vibration of the panel depending of joining methods.
Figure 31C:
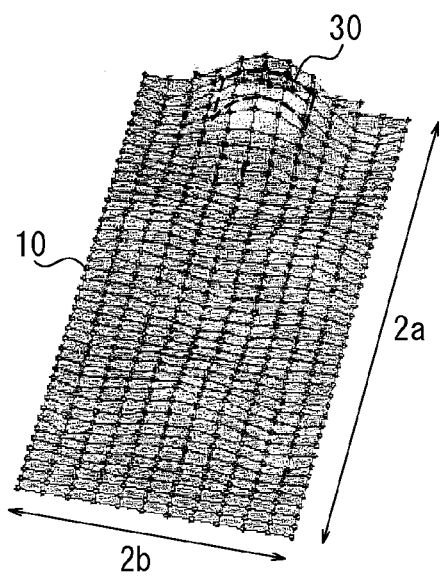
Figure 31B:
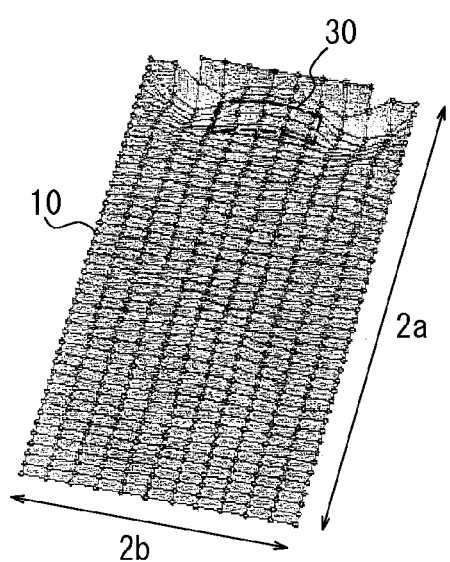
Figure 31D:
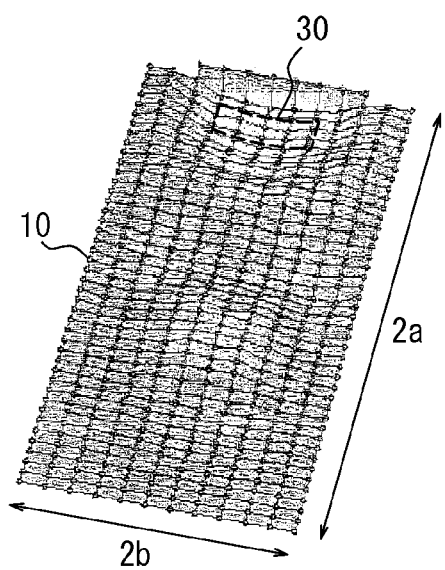

FIGS. 31A-31D are diagrams illustrating examples of vibration of the panel 10 for each different joining method. FIGS. 31A and 31B illustrate the vibration of the panel 10 upon a drive signal of a certain frequency being applied to the piezoelectric element 30, in the case that the panel 10 is attached only by the joining member 12, that is, a double-sided tape. On the other hand, FIGS. 31C and 31D illustrate the vibration of the panel 10 upon a drive signal of the same frequency being applied to the piezoelectric element 30, in the case that the panel 10 is attached by the joining member 2811 and 12, that is, a double-sided tape and adhesive agent. FIGS. 31A and 31C illustrate vibrations in opposite phase to each other, and so do FIGS. 31B and 31D.

In the panel 10, the upper part is bent directly by the piezoelectric element 30, and the vibration is attenuated in the lower part compared to the upper part. The panel 10 is bent by the piezoelectric element 30, such that a part immediately above the piezoelectric element 30 is raised higher than its surrounding parts in the longitudinal direction of the piezoelectric element 30. As illustrated, vibration of larger amplitude is obtained when the panel 10 is attached by double-sided tape and adhesive agent than when the panel 10 is attached only by double-sided tape. Further, the direction of the amplitude of the panel 10 will be discussed below, with reference to a plane of the panel 10 (a first surface). Upside of the first surface is referred to as positive amplitude direction, and downside as negative direction. Thus, for example, looking at the center and right and left ends of the area where the piezoelectric element 30 is attached in the direction 2b along the short side of the panel 10, in the case that the piezoelectric element 30 is attached only by double-sided tape as illustrated in FIGS. 31A and 31B, the center and right and left ends of the area where the piezoelectric element 30 have vibration of opposite amplitude directions. That is, when the center vibrates towards the positive direction, the right and left ends vibrates towards the negative direction, and vice versa. In contrast, in the case that the piezoelectric element 30 is attached by double-sided tape and adhesive agent as illustrated in FIGS. 31C and 31D, the center and right and left ends of the area where the piezoelectric element 30 is attached to the panel 10 have vibration of the same amplitude directions.

This is because the joining member 12 (foam filled double-sided tape) is more deformable with weaker adhesivity than the joining member s 2811 (adhesive agent), and thus in case of the panel 10 being attached only by the joining member 12, depending on the frequency of the drive signal, right and left ends of the panel 10 largely vibrates, which, as a result, suppress the vibration of the center part. In contrast, by disposing the joining member s 2811 in the longitudinal direction, that is, expansion/contraction direction 2b of the piezoelectric element 30, the right and left ends of the panel 10 are securely fixed. As a result, vibration of vicinity of the piezoelectric element 30 may be free from suppression, and thus a preferable sound pressure is obtained.

FIG. 32 illustrates frequency characteristic of the panel 10 according to the fifth embodiment. FIG. 32 illustrates a frequency characteristic 91 in the case of the panel 10 being attached only by the joining member 12 (the joining member 2811 is not disposed near the both ends of the longitudinal direction of the piezoelectric element 30) and a frequency characteristic 92 in the case of the panel 10 being attached by the joining member s 2811 and 12 (the joining member 2811 is disposed near the both ends of the longitudinal direction of the piezoelectric element 30). The horizontal axis represents frequency of the output sound, and the vertical axis represents the sound pressure.

As the frequency characteristic 91 indicates, in the case of the panel 10 being attached only by the joining member 12, the sound pressure falls near 4 kHz and a "dip" occurs. On the other hand, the frequency characteristic 92 indicates, in the case of the panel 10 being attached by the joining member s 2811 and 12, occurrence of the dip is shifted to the band of 6 kHz or higher. That is, a dip is reliably avoided in the frequency band of 400 Hz–3.4 kHz to be used for the voice call of a mobile phone. In addition, sound pressure is increased at 3 kHz or higher. As such, by joining the panel 10 by the joining member s 2811 at the sides of the longitudinal direction, that is expansion/contraction direction 2b, and by the joining member 12 at the periphery of the panel 10, the frequency characteristic of the panel 10 may be improved.

Incidentally, in the joining method illustrated in FIG. 30, a part of the joining member 12 is extended from the periphery of the panel 10 towards the vicinity of both ends of the longitudinal direction of the piezoelectric element 30. As such, compared to the case of the joining member 12 being disposed only at the periphery of the panel 10, the audio property of the panel 10 maybe improved. In other words, in the joining method illustrated in FIG. 30, the joining member 12 disposed at the periphery of the panel 10 and the joining member 12 disposed at the vicinity of both ends of the longitudinal direction of the piezoelectric element 3 are connected (coupled).

Figure 33A:
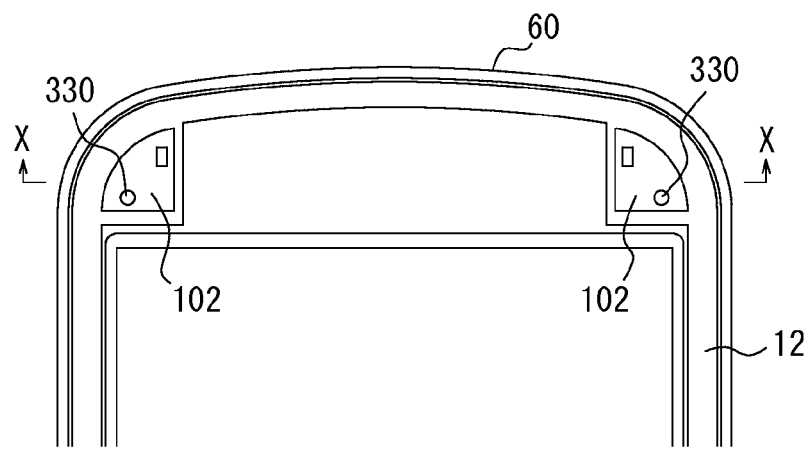
FIGS. 33A-33D illustrate disposition of a joining member in one embodiment.
Figure 33B:
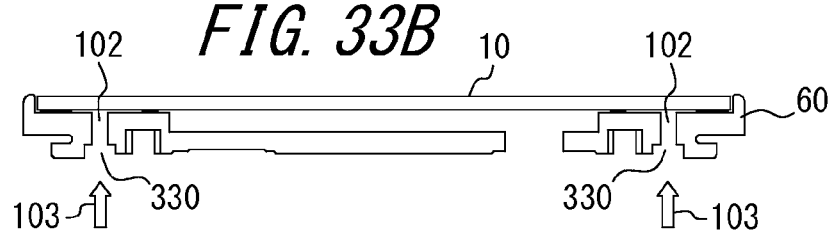
Figure 33C:
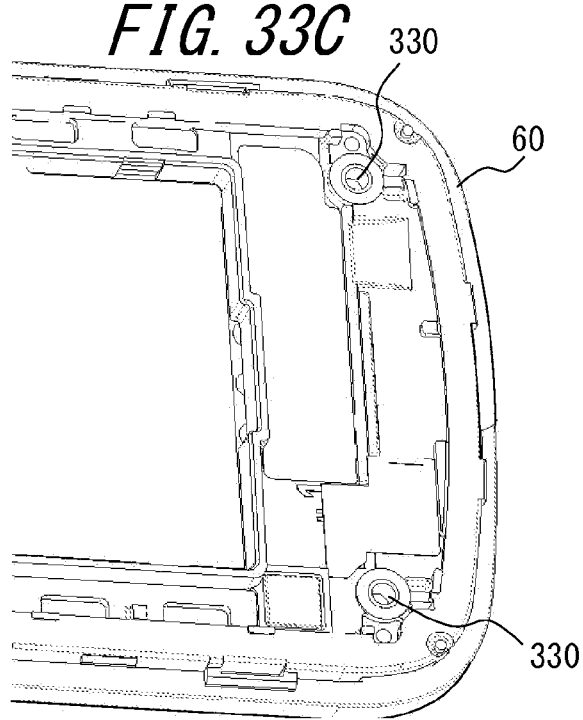

FIGS. 33A-33C illustrate an arrangement of the joining member 2811 of the fifth embodiment in the case that the joining member 2811 is the above mentioned moisture-curing elastic adhesive. FIG. 33A illustrates a magnified view of the front upper part of the housing 60 before the panel 10 being attached. FIG. 33B illustrates cross-section of the housing 60 along line X-X. Here, a case of the panel 10 being arranged is illustrated. FIG. 33C illustrates a perspective view of the housing 60 from the back side.

Figure 33D:
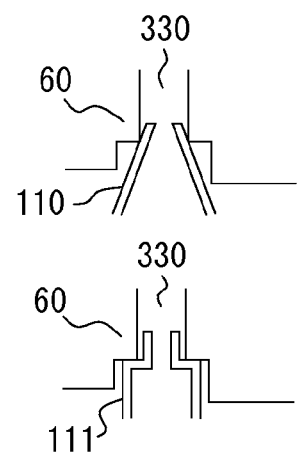

The housing 60 is provide with recesses 102 to place the joining member s 2811. The recesses 102 are provided with holes 330 penetrating to the back side. Upon attaching the panel 10, for example, the joining member 12 is disposed along the outer periphery of the panel 10 so as to surround the recesses 102. And the panel 10 is placed and joined by the joining member s 2811. Here, from the back side of the housing 60, the joining member s 2811, that is adhesive material, is filled in the recesses 102 through holes 330 (arrow 103). On that occasion, as depicted in cross-section of FIG. 33D, by using a nozzle 110 such as tapered nozzle or stepwise nozzle 111 for discharging the adhesive material, opening of the hole 330 and the outer wall of the nozzle come into contact without a gap between the nozzle and the outer periphery of the hole 330, and the recesses 102 may be filled with adhesive material. Thereby, the joining member s 2811, may be disposed and the panel 10 may be attached to the housing 60.

Sixth Embodiment

Figure 34A:
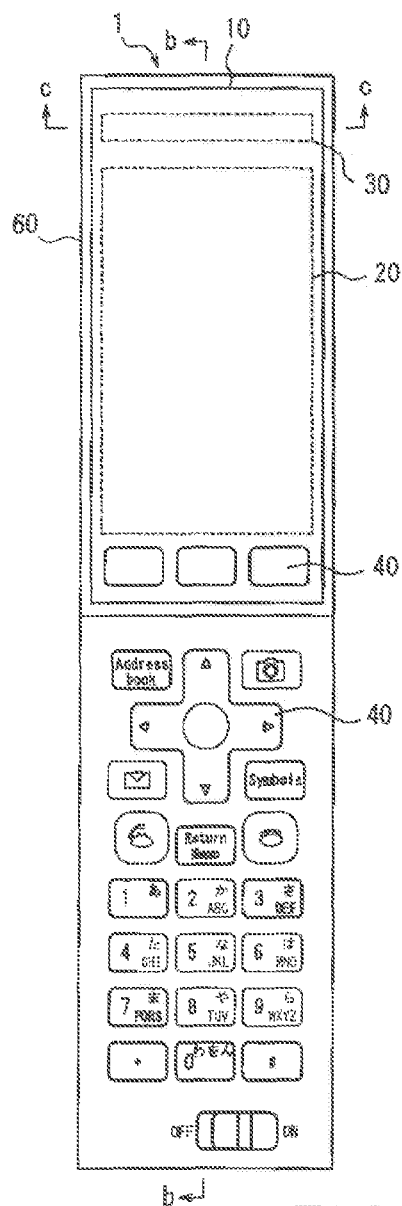
FIGS. 34A-34C illustrate a housing structure of the electronic device according to one embodiment.
Figure 34B:
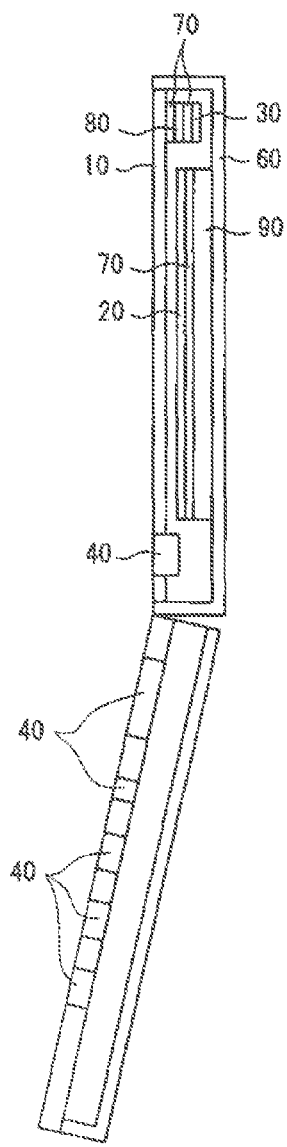
Figure 34C:
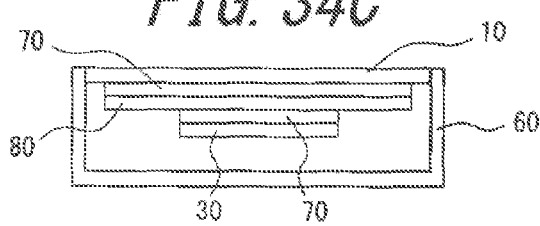

FIG. 34 schematically illustrates parts of a housing structure of the electronic device 1 according to a sixth embodiment. FIG. 34(*a*) is a front view, FIG. 34(*b*) is a cross-sectional view along the b-b line of FIG. 34(*a*), and FIG. 34(*c*) is a cross-sectional view along the c-c line of FIG. 34(*a*). The electronic device 1 illustrated in FIG. 34 is a clamshell mobile phone in which a cover panel (an acrylic plate) protecting the display 20 is disposed on the front face of an upper housing 60 as the panel 10. Also in the sixth embodiment, the panel 10 is attached to the housing 60 similarly to the fifth embodiment. Thereby, similar effect to the fifth embodiment may be obtained.

In the sixth embodiment, a reinforcing member 80 is disposed between the panel 10 and the piezoelectric element 30. The reinforcing member 80 is, for example, a resin plate, sheet metal, or a plate including glass fibers. For example, the reinforcing member 80 is an elastic member such as silicon or rubber. The reinforcing member 80 may also be, for example, a metal plate made of aluminum having a certain degree of elasticity. Or, the reinforcing member 80 may be, for example, a plate made of resin. The resin for forming a sheet of plastic referred to herein may be, for example, polyamide resins. The polyamide resin includes, for example, Lenny™ made of a crystalline thermoplastic resin obtained from adipic acid and metaxylylenediamine, rich in elasticity and strength. Such polyamide resin may be reinforced resin with the base polymer itself reinforced by glass fiber, the carbon fiber, metal fiber and the like. Depending on the additional amount of glass fibers for polyamide resin, carbon fiber or metal fiber, strength and elasticity are adjusted accordingly. For example, reinforced resin as the above is formed by hardening a base material formed by woven glass fibers, carbon fibers or metal fibers after impregnation with resin. Reinforced resin may be formed by curing the mixture of finely cut fiber pieces and the liquid resin. Reinforced resin may be obtained by laminating a resin layer and the base material woven fibers.

In other words, in the electronic device 1 according to the sixth embodiment, the piezoelectric element 30 and the reinforcing member 80 are adhered by the joining member 2670, and furthermore the reinforcing member 80 and the panel 10 are adhered by the joining member 2670. Furthermore, in the sixth embodiment, the display 20 is not adhered to the panel 10, but rather is supported by the housing 60. Specifically, in the electronic device 1 according to the sixth embodiment, the display 20 is separated from the panel 10 and adhered by the joining member 2670 to a support 90, which is a portion of the housing 60. Note that the support 90 is not restricted to being a portion of the housing 60 and may be a member formed from metal, resin or the like and independent from the housing 60.

Figure 35:
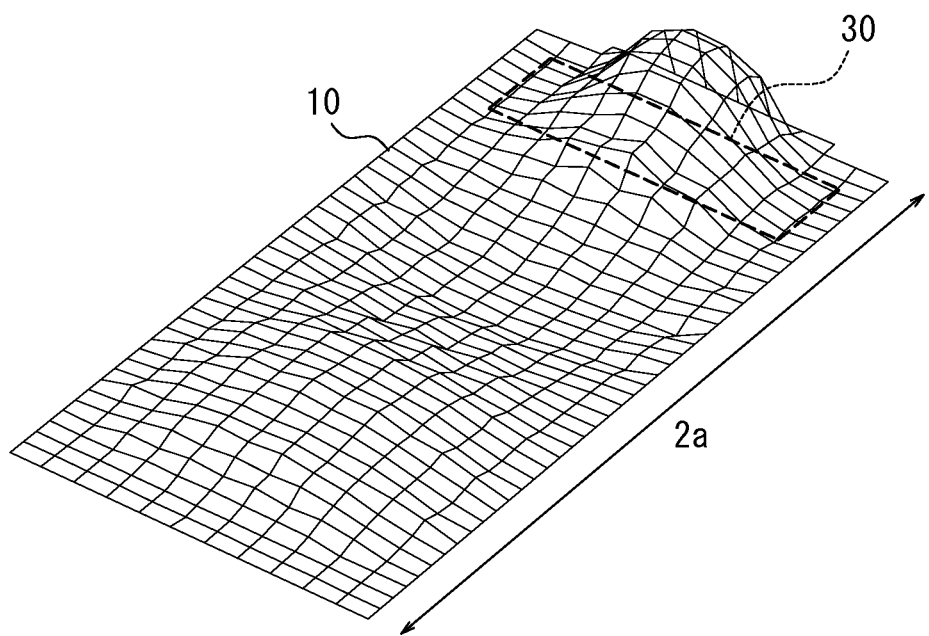
FIG. 35 illustrates examples of vibration of the panel of the electronic device in one embodiment.

FIG. 35 illustrates one example of the vibration of the panel 10 of the electronic device 1 according to the sixth embodiment. In the panel 10, the upper part is bent directly by the piezoelectric element 30, and the vibration is attenuated in the lower part compared to the upper part. The panel 10 is bent by the piezoelectric element 30, such that a part immediately above the piezoelectric element 30 is raised higher than its surrounding parts in the longitudinal direction of the piezoelectric element 30. Since in the electronic device 1 according to the sixth embodiment the panel 10 is the acryl plate with lower rigidity compared to the glass plate, and moreover, the display 20 is not adhered to the back surface of the panel 10, amplitude generated by the piezoelectric element 30 is larger than the case of the electronic device 1 according to the fifth embodiment as illustrated in FIG. 27. Further, the panel 10 vibrates not only at the attach area where the piezoelectric element 30 is attached, but also at area away from the attach area. Here, for example, it is illustrated that the vibration is transmitted along the longitudinal direction 2a of the panel 10 without the vibration being attenuated as much as the case of FIG. 27. Thereby, the user is able to hear air-conduction sound transmitted through air and to hear human body vibration sound by placing the ear in contact with any position of the panel 10.

As described above, according to the electronic device 1 of the present embodiment, the reinforcing member 80 and the panel 10 are deformed due to deformation of the piezoelectric element 30 attached to the panel 10 via the reinforcing member 80, and air conduction sound and vibration sound are transmitted to an object that is in contact with the deformed panel 10. Accordingly, air conduction sound and vibration sound are transmitted to the user without the need for pressing the vibration body itself to the ear. Furthermore, the piezoelectric element 30 is attached to the surface of the panel 10 on the inner side of the housing 60. Accordingly, air conduction sound and vibration sound are transmitted to the user without having to protrude the vibration body from the outer surface of the housing 60. Moreover, the deformation occurs in the area of the panel 10 where the piezoelectric element 30 is disposed and in other areas of the panel 10, for transmission of air conduction sound and vibration sound. Accordingly, the user is able to hear air conduction sound transmitted through air and to hear vibration sound by placing the ear in contact with any position of the panel 10.

Disposing the reinforcing member 80 between the piezoelectric element 30 and the panel 10 can reduce the probability of an external force being transmitted to and damaging the piezoelectric element 30 if, for example, such a force is applied to the panel 10. Moreover, even if the panel 10 is pressed firmly against the user's body, vibrations of the panel 10 do not dampen easily. By disposing the reinforcing member 80 between the piezoelectric element 30 and the panel 10, the resonance frequency of the panel 10 also decreases, thereby improving the acoustic characteristic in the low frequency band. Note that instead of the reinforcing member 80, a plate-shaped anchor may be attached to the piezoelectric element 30 by the joining member 2670.

Although the present invention has been described by way of embodiments with reference to the accompanying drawings, it is to be noted that various changes and modifications will be apparent to those skilled in the art. Therefore, such changes and modifications are to be understood as included within the scope of the present invention. For example, the functions and the like included in the various member s and steps may be reordered in any logically consistent way. Furthermore, components or steps may be combined into one or divided.

Figure 36:
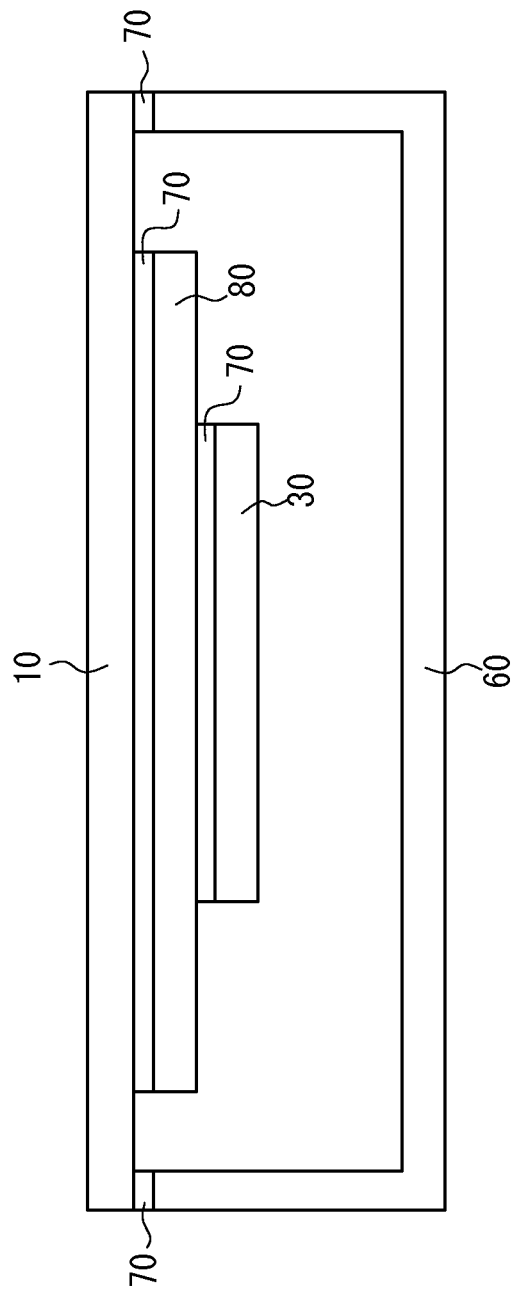
FIG. 36 illustrates joining of the panel and the housing.

For example, as illustrated in FIG. 36, the panel 10 may be configured to be joined to the housing 60 by the joining member 2670. By thus preventing the vibration of the panel 10 from being transmitted directly to the housing 60, the risk that the user drops the electronic device 1 is reduced compared to the case where the housing itself undergoes a large vibration. The joining member 2670 may be the non-thermosetting adhesive agent. The above structure provides an advantage that contraction due to a thermal stress is less likely to occur during curing between the housing 60 and the panel 10. The joining member 2670 may be the double-sided adhesive tape. The above structure provides an advantage that a contraction stress, which often occurs when the adhesive agent is used, is less likely to be generated between the housing 60 and the panel 10.

When the panel 10 and the display 20 are not superposed, for example, the piezoelectric element 30 may be disposed in the middle of the panel 10. When the piezoelectric element 30 is disposed in the middle of the panel 10, the vibration of the piezoelectric element 30 is evenly transmitted to the whole panel 10, thereby improving a quality of air conduction sound and allowing the user to perceive vibration sound even when the user places the ear in contact with the panel 10 at different positions of the panel 10. Note that, similarly to the first embodiment, the piezoelectric element 30 may be provided in plurality.

Although in the above electronic device 1 the piezoelectric element 30 is adhered to the panel 10, the piezoelectric element 30 may be attached to another place than the panel 10. For example, the piezoelectric element 30 may be adhered to a battery lid that is configured to be attached to the housing 60 to cover a battery. Since the battery lid is often attached to a surface different from the panel 10 in the electronic device 1 such as the mobile phone, the above structure enables the user to listen to sound by placing a portion of the body (e.g. the ear) in contact with the surface different from the panel 10.

Further, in the electronic device 1 above, a part or the entirety of the housing 60 may be vibrated by the piezoelectric element 30. For example, if a configuration in which the side wall or the corner of the housing 60 is vibrated by the piezoelectric element 30, the user is able to hear the sound by having a part of the body (cartilage of the ear, for example) in contact with the side wall or the corner of the housing 60 which vibrates.

The panel 10 may form a part or an entirety of any of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel includes the touch panel of the fifth embodiment. The operation panel may also include a sheet key, namely, a component of the foldable mobile phone or the like that is integrally provided with a key top as the operation key and that forms one surface of the housing on an operational side.

Meanwhile, in the fifth embodiment and the sixth embodiment, the joining member used for adhering the panel 10 and the piezoelectric element 30, the joining member used for adhering the panel 10 and the housing 60, and the like are denoted by the same reference numeral as the joining member 2670. However, the joining member used in the fifth embodiment and the sixth embodiment may be different depending on the components to be joined, as appropriate.

REFERENCE SIGNS LIST 1 electronic device
5 radio communication unit
10 panel
12 joining member
20 display
30 piezoelectric element
40 input unit
42 support
44 joining member
46 insert sheet metal
50 controller
60 housing
61 rib
62 dustproof member
80 reinforcing member
90 support
1870 joining member
2670 joining member
2811 joining member

The invention claimed is:

1. An electronic device comprising:
a housing;
a piezoelectric element;
a panel, which is attached to the housing and has a contact area contacting a part of human body, configured to vibrate by the piezoelectric element to generate a vibration sound to be transmitted by vibrating the part of human body; and
a support or a joining member within the housing, wherein the support or joining member is provided so that pressure from an inside of the housing at the contact area of the panel is smaller than a second pressure from the inside of the housing at a different area from the contact area.

2. The electronic device according to claim 1, wherein the panel constitutes a portion or an entirety of any one of a display panel, an input panel, a cover panel and a lid that allows for removal of a rechargeable battery.

3. The electronic device according to claim 2 wherein the panel constitutes a display panel, wherein the piezoelectric element is disposed outside of a display region for a display function.

4. The electronic device according to claim 1, wherein the panel further generates air-conduction sound.

* * * * *